US007361084B2

United States Patent
Takahashi et al.

(10) Patent No.: US 7,361,084 B2
(45) Date of Patent: Apr. 22, 2008

(54) RECORDING MEDIUM STORING GAME PROGRESS CONTROL PROGRAM, GAME PROGRESS CONTROL DEVICE, GAME PROGRESS CONTROL METHOD, GAME SERVER DEVICE, AND GAME PROGRESS CONTROL PROGRAM

(75) Inventors: Hidehisa Takahashi, Amagasaki (JP); Tatsuya Ishikawa, Takarazuka (JP); Kazuhiro Namba, Amagasaki (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 533 days.

(21) Appl. No.: 10/192,795

(22) Filed: Jul. 10, 2002

(65) Prior Publication Data

US 2003/0017863 A1    Jan. 23, 2003

(30) Foreign Application Priority Data

Jul. 18, 2001    (JP)    ............................... 2001-217834

(51) Int. Cl.
  *A63F 9/24*    (2006.01)
(52) U.S. Cl. ....................................................... 463/3
(58) Field of Classification Search ................... 463/3, 463/37, 38
  See application file for complete search history.

(56) References Cited

U.S. PATENT DOCUMENTS

| 5,435,554 | A |   | 7/1995  | Lipson |
| 5,451,053 | A | * | 9/1995  | Garrido .......................... 463/38 |
| 5,586,257 | A | * | 12/1996 | Perlman .......................... 463/42 |
| 5,769,713 | A |   | 6/1998  | Katayama |
| 5,816,918 | A | * | 10/1998 | Kelly et al. ..................... 463/16 |
| 6,120,374 | A |   | 9/2000  | Akada et al. |
| 6,244,956 | B1 |  | 6/2001  | Nakayama et al. |
| 6,257,983 | B1 | * | 7/2001  | Rimoto ........................ 463/38 |
| 6,270,413 | B1 |  | 8/2001  | Aikawa et al. |
| 6,334,813 | B1 |  | 1/2002  | Rimoto et al. |
| 6,340,332 | B1 |  | 1/2002  | Rimoto et al. |
| 6,368,210 | B1 | * | 4/2002  | Toyohara et al. ............... 463/3 |
| 6,394,894 | B1 |  | 5/2002  | Okitsu et al. |
| 6,398,647 | B1 |  | 6/2002  | Hirai et al. |

(Continued)

FOREIGN PATENT DOCUMENTS

EP    0 686 944    12/1995

(Continued)

OTHER PUBLICATIONS

GameSpot: Triple Play 2001 Review, http://www.gamespot.com/ps/sports/tripleplay2001/review.html?om_act=convert&om_clk=gssummary&tag=summary;review.*

(Continued)

*Primary Examiner*—Xuan M. Thai
*Assistant Examiner*—Jasson H. Yoo
(74) *Attorney, Agent, or Firm*—Jordan and Hamburg LLP

(57) ABSTRACT

Realization of a game with good operating properties using a personal computer is made possible. Because the home position of a catcher's mitt character determining a pitch course can be determined, and movement to the home position performed, by a single key operation of the keyboard, return to the home position can be performed with ease similar to that possible when a player removes a hand from a joystick or similar in dedicated game equipment to cause return to a home position, so that operating properties are improved.

25 Claims, 14 Drawing Sheets

U.S. PATENT DOCUMENTS

| | | | |
|---|---|---|---|
| 6,482,090 | B1 | 11/2002 | Rimoto et al. |
| 6,494,783 | B2 | 12/2002 | Namba et al. |
| 2001/0006908 | A1* | 7/2001 | Fujioka et al. ............... 463/3 |
| 2001/0029202 | A1 | 10/2001 | Kondo et al. |
| 2002/0103016 | A1 | 8/2002 | Namba et al. |
| 2002/0107058 | A1 | 8/2002 | Namba et al. |
| 2003/0003977 | A1 | 1/2003 | Takahashi et al. |
| 2003/0022707 | A1 | 1/2003 | Namba et al. |

FOREIGN PATENT DOCUMENTS

| | | |
|---|---|---|
| EP | 1 060 769 | 12/2000 |
| EP | 1 072 299 | 1/2001 |
| JP | 70 21007 | 1/1995 |
| JP | 9-109648 | 4/1997 |
| JP | 2000-167252 | 6/2000 |
| JP | 2000-317140 | 11/2000 |

OTHER PUBLICATIONS

Seiji Nakamura, Konami releases "Live of powerful professional baseball game, online match version" for PC on Jun. 28, [online], May 8, 2001, [Search date: Oct. 30, 2003], Internet<URL:http://www.watch.impress.co.jp/game/docs/20010508/pawapuro.htm>.

Takakazu Kitamura, Konami recruits test monitors of "Live of powerful professional baseball game, online match version" [online], May 11, 2001, [Search date: May 13, 2004] Internet <URL:http://www.watch.impress.co.jp/game/docs/20010511/konami.htm>.

Mar. 25, 2000 "Triple Play 2001 Cheats" [online]. Mar. 25, 2000, retrieved on Jun. 7, 2005]. Retrieved from the Internet: <URL:http://www.cheats.gamespy.com/pc-cheats/triple-play-2001>.

Mar. 31, 1999 FKrueger "Triple Play 2000" Game Over Online Magazine. [online]. Mar. 31, 1999, retrieved on Jun. 1, 2005]. Retrived from the Internet: <URL: http://www.game-over.net/reviews.php?id=130&page=reviews>. FKrueger.

Jan. 2000,"Triple Play Baseball" Manual. 2000. EA Sports, Redwood City, CA.

Jan. 2001, "Triple Play 2001" Manual. EA Sports, Redwood City, CA.

Mar. 8, 1999 "Triple Play 2000" PC Games: Triple Play 200 by Electronic Arts. [online]. Mar. 8, 1999, [retrieved on Nov. 18, 2004]. Retrieved from the Internet: <URL: http:pc.ign.com/articles/131/131249p1.html?whreFrom=login>.

* cited by examiner

RECORDING MEDIUM STORING GAME PROGRESS CONTROL PROGRAM, GAME PROGRESS CONTROL DEVICE, GAME PROGRESS CONTROL METHOD, GAME SERVER DEVICE, AND GAME PROGRESS CONTROL PROGRAM

BACKGROUND OF THE INVENTION

1. Field of the Invention

This invention relates to game progress control technology, which controls the progress of a game. In particular, this invention relates to game progress control technology which controls the progress of a game in which the game proceeds through the alternation of offense and defense between a player team and a computer-controlled team, or an opposing player team, via a ball character.

2. Description of the Related Art

In recent years, game programs played on a computer which imitate competitive games such as baseball and soccer have been played widely. The nature of such competition is diverse, but normally in most cases, a player (game player) uses an operating unit to manipulate the behavior of a player character, and points are awarded based on how appropriately the player character behaves with respect to a ball launched by an opposing character manipulated by the computer device or by a human opponent. For example, in a baseball game, when the player character is the pitcher character, the essence of manipulation is how to throw the ball character such that it is not hit by the batter character, which is the opponent character, and the basis for receiving points is whether or not the ball character is hit by the batter character. And, when the player character is the batter character, the basis for receiving points consists in how well the ball character, thrown by the pitcher character which is the opponent character, is hit back toward the pitcher character.

At this time, operations by the player, when the player character is the pitcher character, consist mainly in determining the pitch type, pitch speed, pitch course, and similar of the pitcher character, and when the player character is the batter character, consist mainly in selecting and adjusting the position and stance of the batter character and the type of bat character, and of determining the swing timing, swing position and similar of the bat character. In order to achieve such operations, normally an operating unit connected to the computer main unit is used.

This operating unit generally is able to identify an arbitrary two-dimensional coordinate position by detecting displacement amounts in the X-coordinate and Y-coordinate directions resulting from player operation, and to transmit the identified coordinate position to the computer main unit. The pitch course and similar are realized by identifying this coordinate position. Also, a timing signal is generated at an arbitrary time by pressing a switch, and this timing signal is transmitted to the computer main unit. The timing for pitching motion initiation is determined by this timing signal.

Computers may be broadly divided into computers specialized for game use, such as dedicated game equipment, and computers which can support a broad range of applications, such as personal computers. In the former case, as the operating unit, an analog joystick or digital joystick, or a controller comprising these is used. In an analog joystick, sensors which output the X coordinate and Y coordinate as analog values are positioned in the base end of a protuberance of prescribed size, so that the player can specify an arbitrary coordinate position in a two-dimensional region, corresponding to the tilt amount, by tilting the with the fingers the protuberance. In a digital joystick, most usually a cross-shaped key has sensors (or switches) to derive the coordinates in each of the directions, up, down, right and left; by pressing one or two ends of the cross-shaped key simultaneously, the player can specify an arbitrary coordinate position in a two-dimensional region.

As the operating unit of a personal computer, a mouse, a portable type trackball, a portable type touch pad, or other pointing device, and a keyboard are generally used. Of these, a mouse and a portable type trackball have a pair of sensors which detect displacement amounts in both the X and the Y coordinates, and a ball element to simultaneously drive both sensors; by rolling the ball element in the target direction, either directly with the player's hand or indirectly via a disc surface, a coordinate position in a two-dimensional region can be specified. A touch pad has a sensor which detects the position of contact of the finger of a human, and the direction of motion and amount of motion of the finger, and can be used to specify an arbitrary coordinate position in a two-dimensional region based on the detection results; in principle, it is a mouse or similar realized by digital means.

The major difference between the operating unit of dedicated game equipment and the operating unit of a personal computer is in the handling of the pointer. That is, in the case of the operating unit of the dedicated game equipment, data corresponding to the pointer (hereafter called a "virtual pointer") exists within the device; because this virtual pointer continues to move so long as the player continues to press the protuberance or cross-shaped key, when the virtual pointer is to be rapidly returned to a home position, such tools afford superior operating properties compared with a mouse or similar. That is, the operating unit of a personal computer is inferior in operating properties to the operating unit of dedicated game equipment.

SUMMARY OF THE INVENTION

The present invention was devised in consideration of the above problem, and has as an object the provision of a game progress control program, game progress control device, game progress control method, and game server device which have satisfactory operating properties.

In order to achieve the above objects, the present invention relates to a recording medium which stores a game progress control program, which causes a game image including a plurality of characters to be displayed on the monitor screen of a computer, receives from a player instructions input by means of movement operations and button operations made with a pointing device or key operations made with a keyboard, and causes the game to progress through the alternation of offense and defense between a player team and a computer-controlled team, or an opposing player team, via a ball character; and is characterized in that, when the player team is the defensive side, the above computer functions as defense operation means, receiving instructions of defensive movements for a defense character using the above pointing device or keyboard, and causing the defense character to perform defensive movements; when the player team is the offensive side, the above computer functions as offense operation means, receiving instructions of offensive movements for an offense character using the above pointing device or keyboard, and causing the offense character to perform offensive movements; and, at least either the above defense operation means or the above offense operation means receives a prescribed key operation of the above keyboard, and causes the position of a prescribed character related to defense operation or to offense operation to be returned to a prescribed home position.

According to the invention as described, a game progress control program stored in the recording medium, which causes a game image including a plurality of characters to be displayed on the monitor screen of a computer, receives from a player instructions input by means of movement operations and button operations made with a pointing device or key operations made with a keyboard, and causes the game to progress through the alternation of offense and defense between a player team and a computer-controlled team, or an opposing player team, via a ball character, and is characterized in that, when the player team is the defensive side, the computer functions as defense operation means, receiving instructions of defensive movements for a defense character using the pointing device or keyboard, and causing the defense character to perform defensive movements; when the player team is the offensive side, the computer functions as offense operation means, receiving instructions of offensive movements for an offense character using the pointing device or keyboard, and causing the offense character to perform offensive movements; and, at least either the defense operation means or the offense operation means receives a prescribed key operation of the keyboard, and causes the position of a prescribed character related to defense operation or to offense operation to be returned to a prescribed home position.

In other words, through the defense operation means, instruction operations for defense movement of the defense character using the pointing device or keyboard are accepted, and the defense character performs defensive movements; and, through the offense operation means, instruction operations for offense movement of the offense character using the pointing device or keyboard are accepted, and the offense character performs offensive movements. Also, at least either the defense operation means or the offense operation means receives a prescribed key operation of the keyboard, and causes the position of a prescribed character related to defense operation or to offense operation to be returned to a prescribed home position (the position used with the greatest frequency by the player).

As a result, when the position of a prescribed character relating to defensive operation or offensive operation is different from the home position due to operations using the pointing device or keyboard, if the player wishes to return the position of this prescribed character relating to defensive or offensive operation to the home position, a prescribed key operation of the keyboard is accepted to cause the position of the prescribed character relating to defensive or offensive operation to be returned to the prescribed home position, similarly to the case with dedicated game equipment in which the player can cause return to the home position by removing a hand from the joystick or similar; so that operating properties are improved.

These and other objects, features, and advantages of the present invention will become more apparent upon reading the following detailed description along with the accompanying drawings.

DESCRIPTION OF THE PREFERRED EMBODIMENTS

Figure 1:
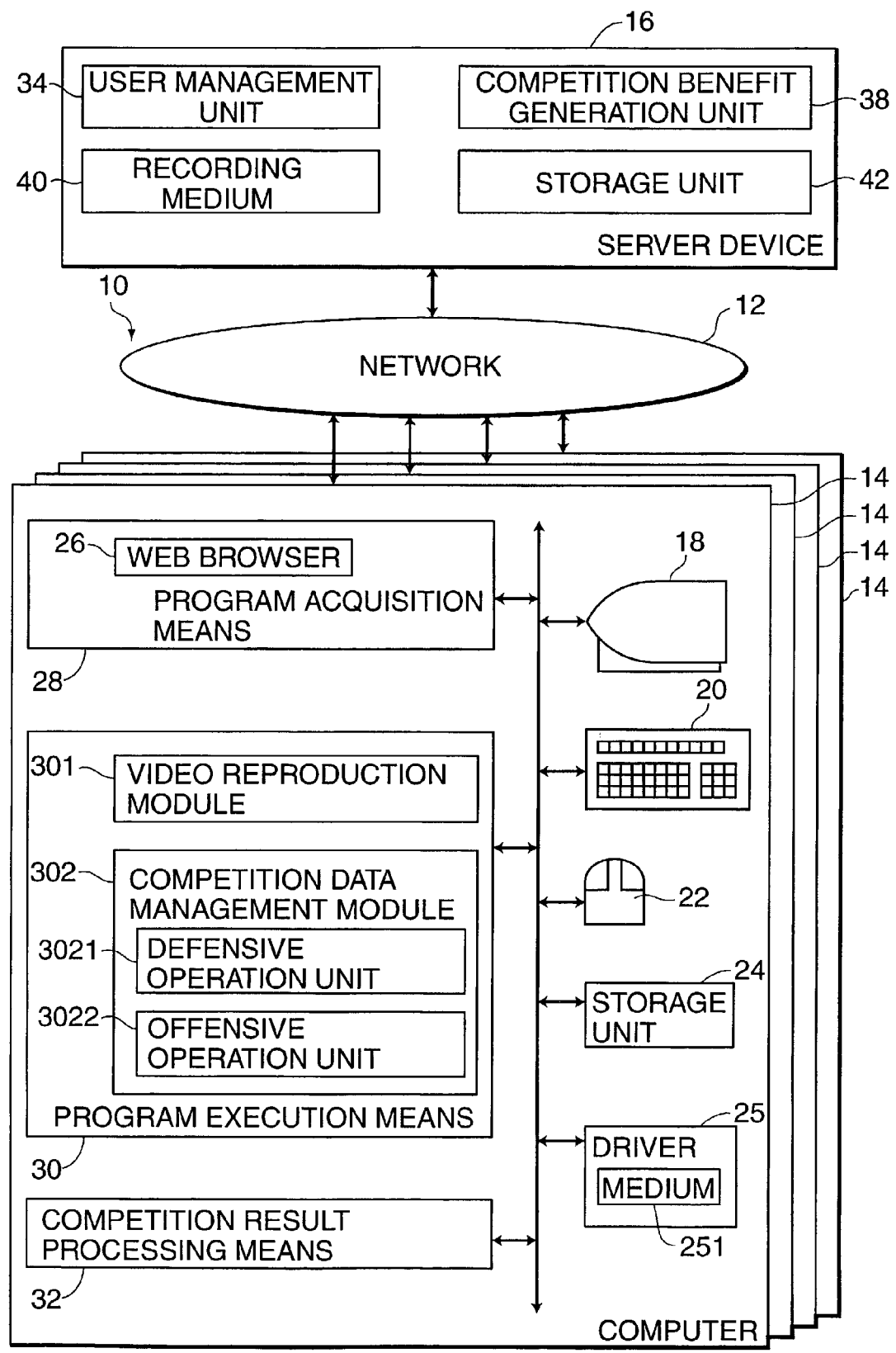
FIG. 1 is an example of the configuration of a game system to which a game progress control program of this invention is applied.

FIG. 1 is an example of the configuration of a game system 10 to which a game progress control program of this invention is applied. In this figure, the game system 10 comprises a plurality of personal computers 14 which are terminal devices connected to the Internet 12, and a server device 16. In this aspect, a case in which the players (game players) of the personal computers 14 (hereafter "computers 14") participate at an arbitrary time in a game of baseball, as a competitive game, over the Internet is explained.

A computer 14 is connected to a display 18, keyboard 20, mouse 22, RAM or other storage unit 24, and recording media driver 25 which reads a program or other data stored on a CD-ROM or other storage media 251, and has a network connection tool to enable connection to the Internet 12, as well as incorporating a web browser 26. In this aspect, in order to realize the baseball game, each computer 14 comprises program acquisition means 28, program execution means 30, and competition result processing means 32.

After performing initial registration with the server device 16, the program acquisition means 28 acquires a prescribed competition program (a baseball game program comprising a game progress control program of this invention) from a screen provided by the server device 16, and expands the competition program in its own memory area. A functional module for acquisition of the competition program may be created independently; but in a more simple implementation, the functions of the web browser 26 may be utilized to acquire the competition program from the server device 16. The competition program may be acquired by the computer 14 from the server device 16 each time the game is played; or, the program may be acquired only at the time of initial registration, and subsequently stored on the computer 14. Or, the competition program may be installed in advance on the computer 14; in this case, the program acquisition means 28 is unnecessary.

The above competition program comprises a video reproduction module 301 and a competition data management module 302. It is preferable that both these modules be combined and exist on the server device 16; but these modules may exist in distributed form on different server devices as well.

The video reproduction module 301 reproduces three-dimensional video. As this module, Macromedia's "Shockwave", which is widely used on the Internet, may for example be used. The competition data management module 302 manages the original data for video reproduced by the video reproduction module 301 and various data used to develop the story of the competition; in this aspect, image data, audio data and text data relating to the pitcher character, batter character, ball character, contact cursor which is the point at which the ball character is captured by the bat character, the strike zone, bases, home base, stands and other background, which are necessary for realization of a baseball game, are managed according to the rules of competition. Also, each of the image data items is stipulated as coordinate data in the game space. Also, of the various data items, the image data items at least are managed in a plurality of layers so as to form a single display image. That is, movement and other representation modes of characters are changed separately for each layer. Such a management mode based on a plurality of layers has the advantage of enabling reduction of the number of original data items at the time of video reproduction.

The competition data management module 302 comprises a defensive operation unit 3021 (equivalent to defensive operation means and movement operation means), which, when the player team is on the defensive side, receives instructions for pitching movements of the pitcher character using the mouse 22 or keyboard 20, and an offensive operation unit 3022 (equivalent to batting operation means and movement operation means), which, when the player team is on the offensive side, receives instructions for batting movements of the batter character using the mouse 22 or keyboard 20. Details of the functions of the defensive operation unit 3021 and offensive operation unit 3022 are explained by the flow charts of FIG. 2 and FIG. 9, described below.

The program execution means 30 generates various events related to the baseball game by executing programs in other modules, primarily the program in the competition data management module 302, deriving the result through computations. Specifically, the competition data management module 302 and similar are downloaded to the web browser 26, CGI is used to run the program, and various events are generated. Images and text related to the competition are all displayed on the browser screen, and all information is transmitted between the server device 16 and player via the web browser 26 and CGI on the server device 16. The competition result processing means 32 operates in cooperation with the competition data management module 302 and similar to perform processing related to the baseball game result, and in particular to perform bidirectional communication with the server device 16 and to present information to the player.

The program execution means 30 and competition result processing means 32 can be realized by a web browser 26 and a module group acquired from the server 16 by the computer 14, as described above; but it is also possible to record program code realizing a portion of or all of the above functions on a CD-ROM or other recording media, or on transport media identifiable in the form of "signals", and to appropriately download (or install) this program code to the computer 14 prior to execution of the baseball game.

On the other hand, the server device 16 has, in addition to basic server device functions to provide screens to each computer 14, the functions of a user management unit 34 and a competition benefits generation unit 38. These functions are realized through program code recorded in a form readable by the CPU of the server device 16. The server device 16 has recording media 40 such as a CD-ROM, hard disk or similar, on which is recorded a competition program to be provided over the Internet 12 in response to requests from players, as well as a storage unit 42 comprising RAM or similar, which stores data transmitted from each computer 14.

The user management unit 34 manages, for each player, user-specific information accessed through screens, and cumulative values of baseball game results and statistical data. Also, the user management unit 34 has functions for performing security checks for access as necessary. The competition benefits generation unit 38 generates, for each player, incentive information with respect to baseball game results (number of home runs and batting average, earned-run average and number of strikeouts, and similar). Here "incentive information" is information provided to a player on the occasion of continuation of competition, and may take various forms. Examples of incentive information include property information or other benefit information provided to a player who has satisfied conditions specified by the sponsor of the competition, or a password enabling free access to a site for which access normally requires payment. This incentive information can be set in stages. Here, in the earliest stage, ranking is performed in order to indicate to a player the position of that player's competitive ability relative to the competitive abilities of other players, and specific displays are presented to persons for which each incentive stage is applicable.

In this aspect, in the baseball game executed by the above-described game system 10, a player team competes for up to a maximum of nine innings with a team under computer control (hereafter a "computer team") or with another player team (that is, the same player repeatedly alternates between offense and defense), and the player team's ranking is determined relative to other player teams playing the same baseball game over the Internet based on the cumulative number of winning points over the computer team (or another player team) at the time the game ends. Here the number of winning points is the difference in points scored by the player team and the computer team; for example, if the player team has scored 5 points and the computer team (or another player team) has scored 3 points, then the number of winning points is +2; if the player team has scored 3 points and the computer team (or another player team) has scored 5 points, then the number of winning points is −2.

When a player team is on the offensive side, the player performs operations using the mouse 22 and keyboard 20 to perform batting movements of the batter character, and the movements of the runner character or similar are processed automatically according to baseball rules. When a player team is on the defensive side, the player performs operations using the mouse 22 and keyboard 20 to perform pitching movements of the pitcher character, and movements of the outfield characters and other team members are processed automatically according to baseball rules.

Figure 2:
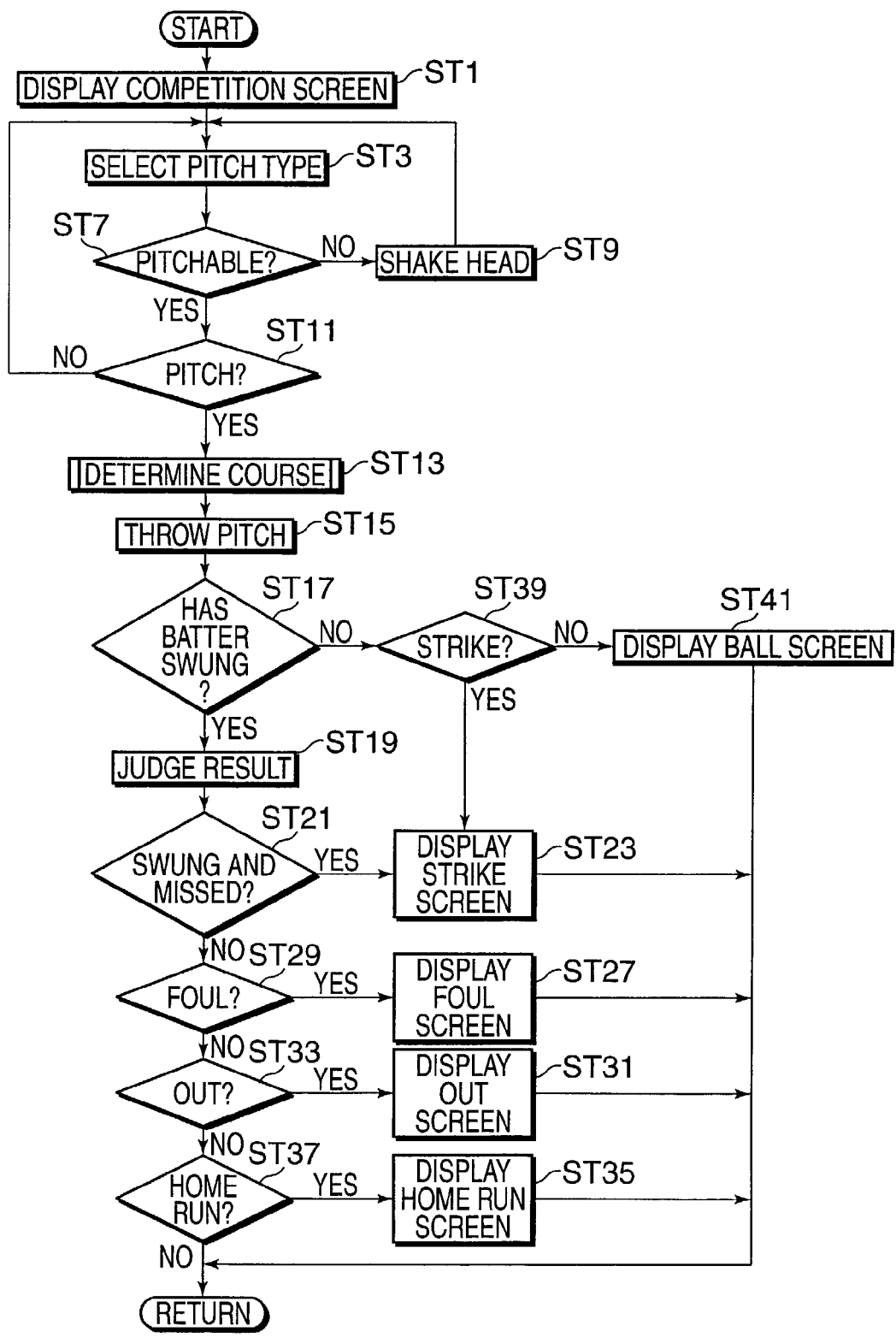
FIG. 2 is a flow chart used to explain the operation of a game system when the player team is on the defensive side.
Figure 9:
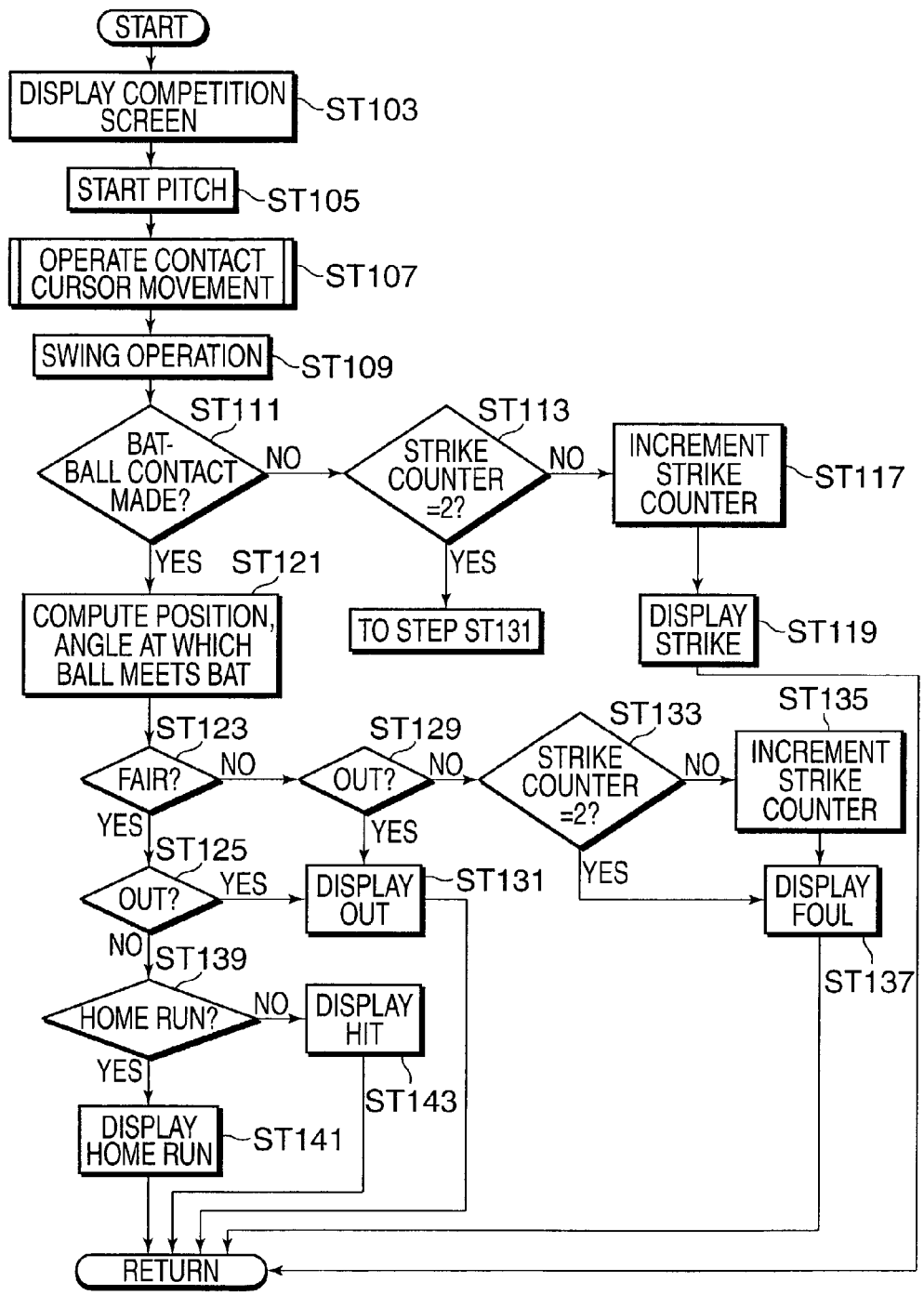
FIG. 9 is a flow chart used to explain the operation of a game system when the player team is on the offensive side.

Next, the procedure for processing when the baseball game is played using the game system 10 is explained, based on the flow charts shown in FIGS. 2 and 9, and referring to the display screens and similar shown in FIGS. 3, 4, 6, 7, 11 and 12. The mouse 22 is primarily used for manipulation of the player character (when the player team is on the defensive side, the pitcher character; when the player team is on the offensive side, the batter character); this is in consideration of the facts that a displacement direction and displacement amount for a pointer displayed on the monitor 18 can be input in a single operation, so that even without experience it is easy to rapidly displace the pointer to a random position, and that the mouse 22 is the most widespread input device among personal computer players.

Figure 3:
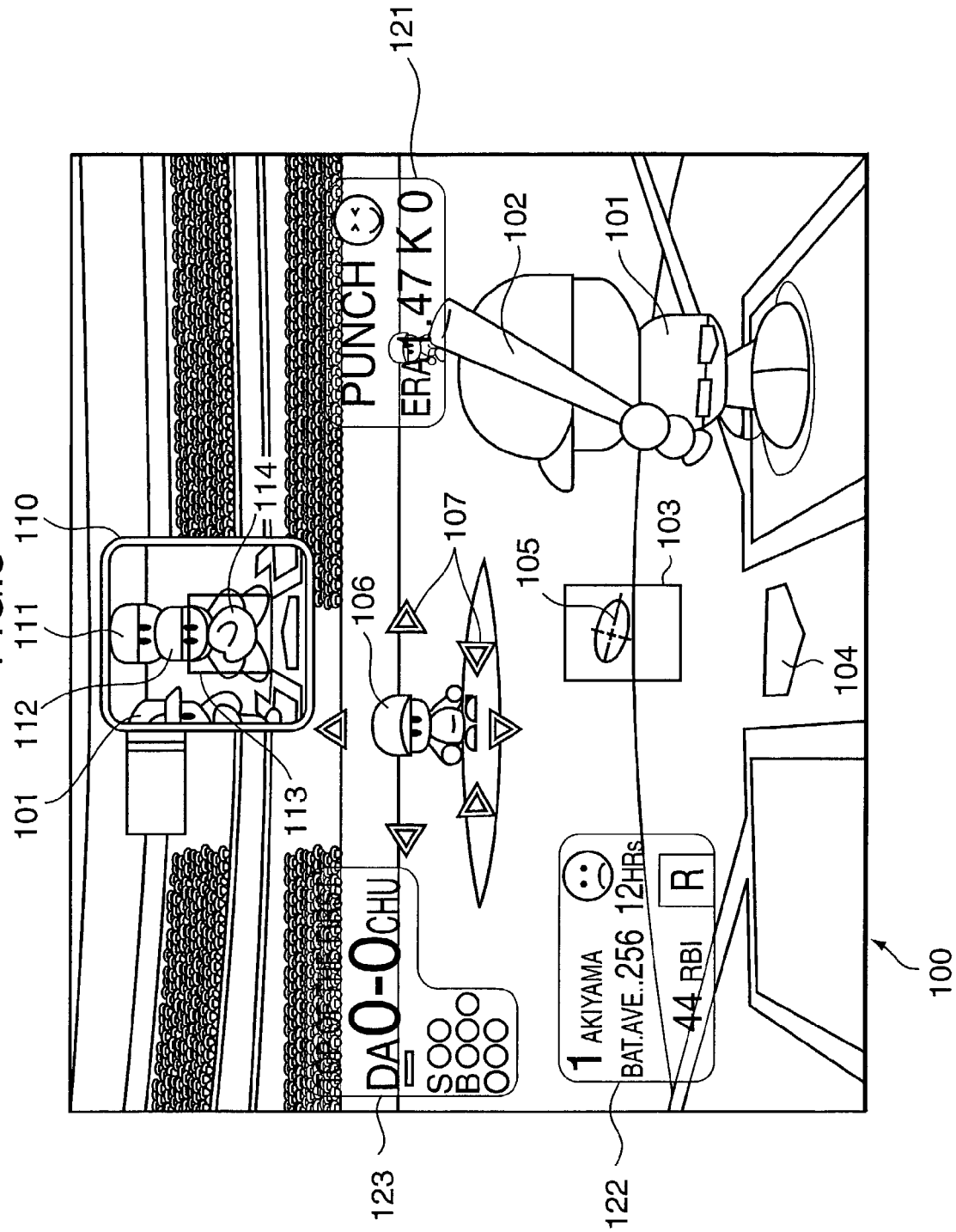
FIG. 3 is a competition screen shown on the monitor of a game system.

First, processing when the player team is on the defensive side (that is, when the player character is the pitcher character) is explained, based on the flow chart shown in FIG. 2. All of the processing of the flow chart shown in FIG. 2 is executed by the defensive operation unit 3021. In the flow chart of FIG. 2, first, a competition screen 100 such as that shown in FIG. 3 is displayed on the monitor 18 (step ST1). The pitcher character 106 of the player team is displayed in the substantial center of the competition screen 100 shown in FIG. 3, and the batter character 101 of the computer team (or other player team), gripping the bat character 102, is displayed in the batter box. Pitch type selection arrows 107, used to select the pitch type when pitching, are displayed surrounding the pitcher character 106. And, the strike zone 103 is displayed above home base 104, while the contact cursor 105, which is manipulated by the computer (or by the other player), is displayed. In the top-center of the screen, a small screen inset 110 is displayed, showing the batter character 101 as seen by the pitcher character 106; in the center of this small screen inset 110, the batter character 101, the umpire character 111, the catcher character 112, and the catcher's mitt character 114 worn by the catcher character 112, are displayed. On the right side of the pitcher character 106, the name, earned-run average, and other information 121 relating to the pitcher character 106 is displayed. In the bottom-left of the screen, the name, batting average, and other information 122 relating to the batter character 101 is displayed. At the center-left of the screen, the number of strikes, number of balls, number of outs, and similar, which is information 123 relating to the game currently being played, is displayed. The number of strikes, number of balls, and number of outs are counted by a strike counter, ball counter, and out counter, respectively.

Next, the player uses the mouse 22 to select the "pitch type" (step ST3). In the following explanation, movement directions are explained when viewing the mouse 22 from above. When the mouse 22 is moved in substantially the upward direction, "straight" is selected as the pitch type. When the mouse 22 is moved in substantially to the right, "screwball" is selected as the pitch type. When the mouse 22 is moved substantially downward and to the right, "sinker" is selected as the pitch type. When the mouse 22 is moved in substantially the downward direction, among "forkball", "knuckleball", or "changeup", whichever pitch type is set as a "pitchable pitch type" for the currently selected pitcher character 106, is selected as the pitch type. Here, "pitchable pitch types" for the pitcher character 106 are set in advance as an ability parameter for each pitcher character 106. Hence if the pitcher character 106 is changed by the player, that is, if there is a pitcher substitution (the details of the screen and operation method are here omitted), then the "pitchable pitch types" are updated from the "pitchable pitch types" set for the previously selected pitcher character 106 to the "pitchable pitch types" set for the newly selected pitcher character 106.

When the mouse 22 is moved substantially downward and to the left, "curve" is selected as the pitch type. When the mouse 22 is moved substantially to the left, "slider" is selected as the pitch type. Here, the initial pitch type prior to the above operations to select a pitch type is "slowball". Hence if the player performs the pitching operation of step ST11 without selecting a pitch type, the pitch type becomes "slowball".

A judgment is then performed to determine whether the pitch type selected by the player in step ST3 is included in the "pitchable pitch types" set for the current pitcher character 106 (whether the pitcher "has that pitch" or not) (step ST7). If not included in the "pitchable pitch types", a screen is displayed in which the pitcher character 106 shakes his head sideways (omitted in the figures) (step ST9), and processing returns to step ST3. If included in the "pitchable pitch types", a judgment is performed to determine whether an instruction has been given by the player using the mouse 22 to have the pitcher character 106 begin pitching (step ST11).

If an instruction is given to begin pitching, processing proceeds to step ST13. If no instruction has been given to begin pitching, processing returns to step ST3. Here, it is assumed that an instruction to begin the pitching action is given by clicking the left button of the mouse. When in step ST11 an instruction to begin pitching is given (the left mouse button is clicked), the pitcher character 106 begins the pitching action (pitching motion). And, the player then gives instructions to determine the pitch course for the pitcher character 106, using the mouse 22 and keyboard 20 (step ST13).

Figure 4:
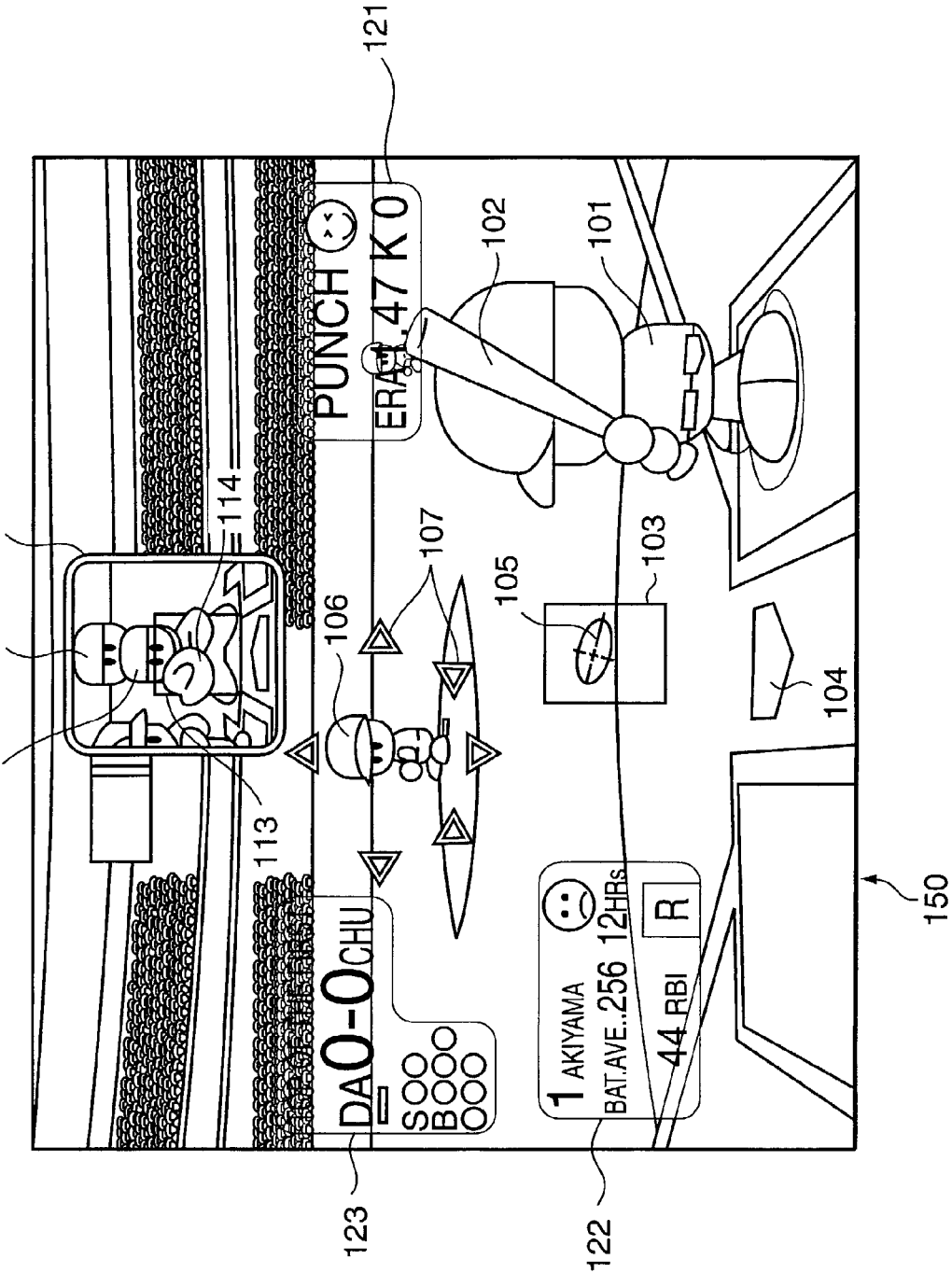
FIG. 4 is a competition screen shown on the monitor of a game system.

First, the case in which the mouse 22 is moved to give instructions determining the pitch course is explained, referring to the screen drawing 150 of FIG. 4. Pitch course instructions are given by moving the catcher's mitt character 114 in the small screen inset 110 according to the direction and amount of motion of the mouse 22. For example, if the mouse is moved upward and to the left as seen from above, the catcher's mitt character 114 moves upward and to the left (FIG. 4). Because instructions for the pitch course can be given through movement of the mouse 22, instructions for the pitch course desired by the player can be issued easily and quickly. It is assumed that the time during which the catcher's mitt character 114 can move is from the instruction to begin pitching in step ST11, until, a prescribed length of time later, the ball character is released by the pitcher character 106. The range of possible motion of the catcher's mitt character 114 is approximately the range of the strike zone 113.

Figure 5:
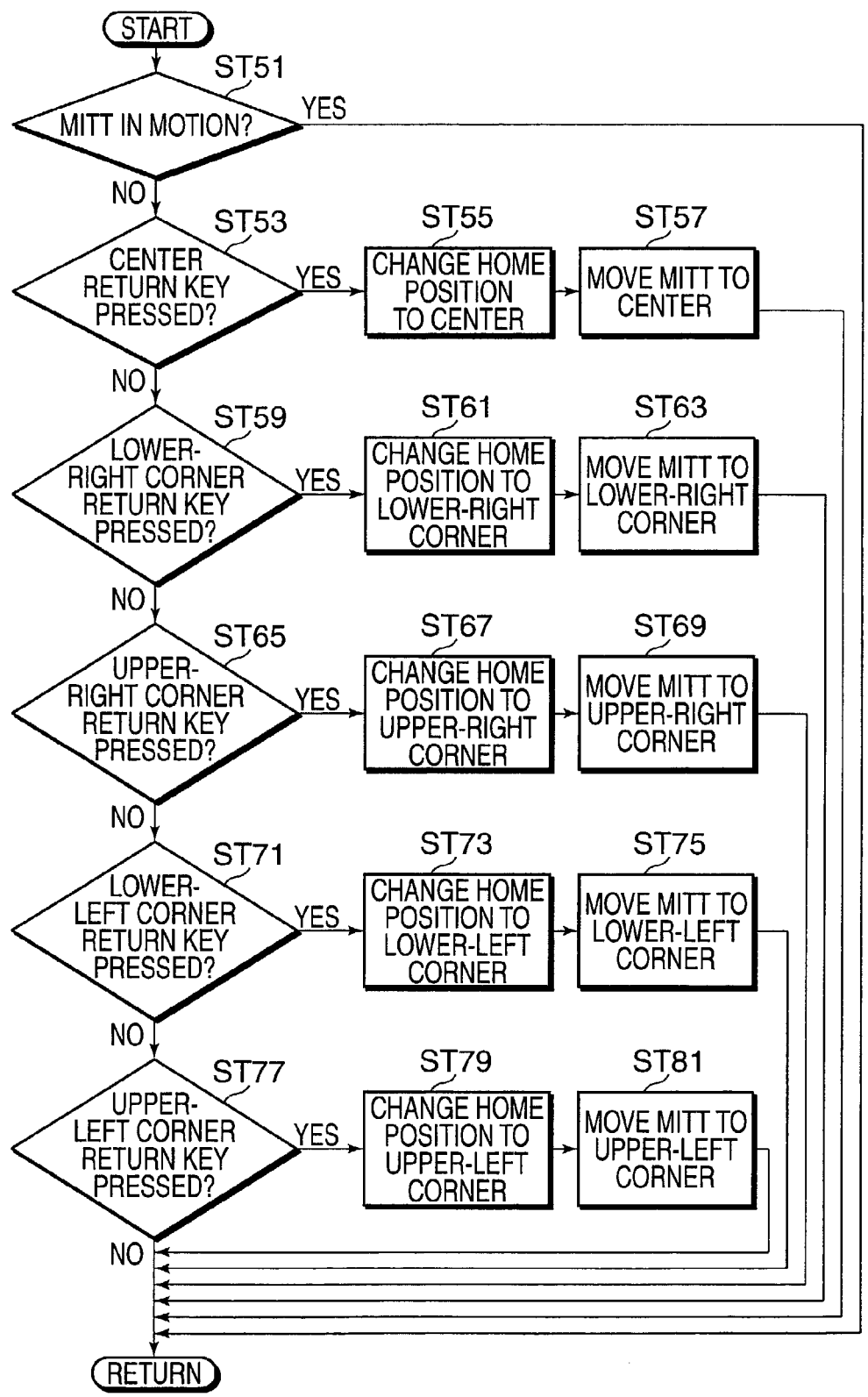
FIG. 5 is a detailed flow chart used to explain the operation of a game system when the player team is on the defensive side.
Figure 6:
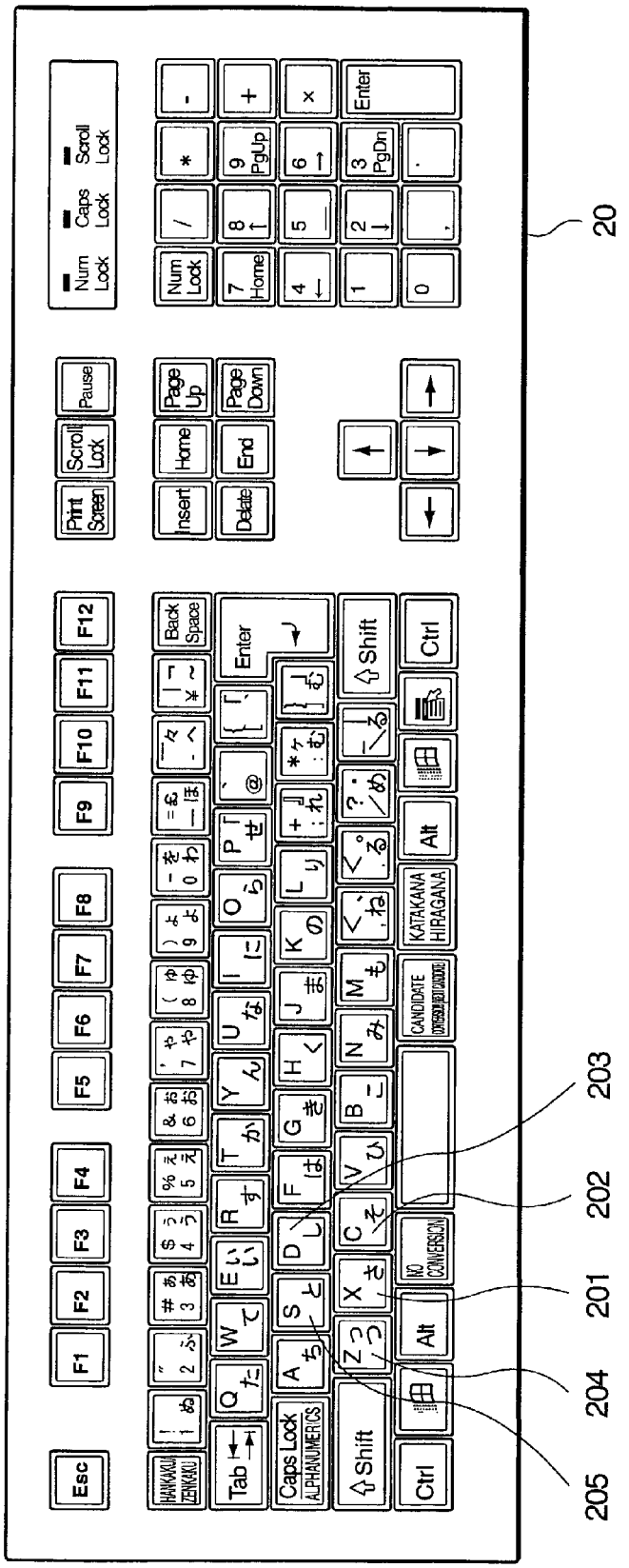
FIG. 6 is an example of the key arrangement of a keyboard.
Figure 7:
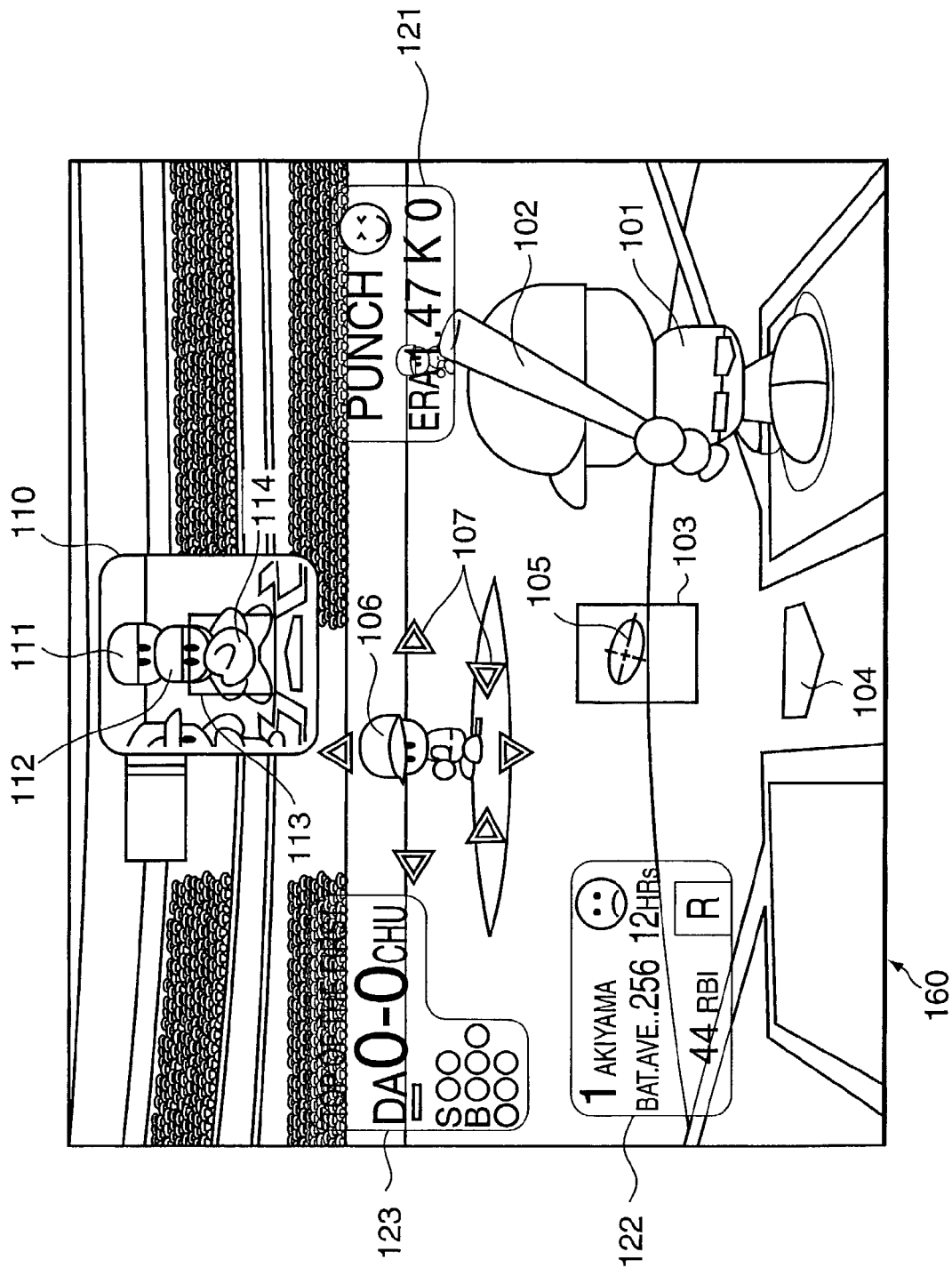
FIG. 7 is a competition screen shown on the monitor of a game system.
Figure 8:
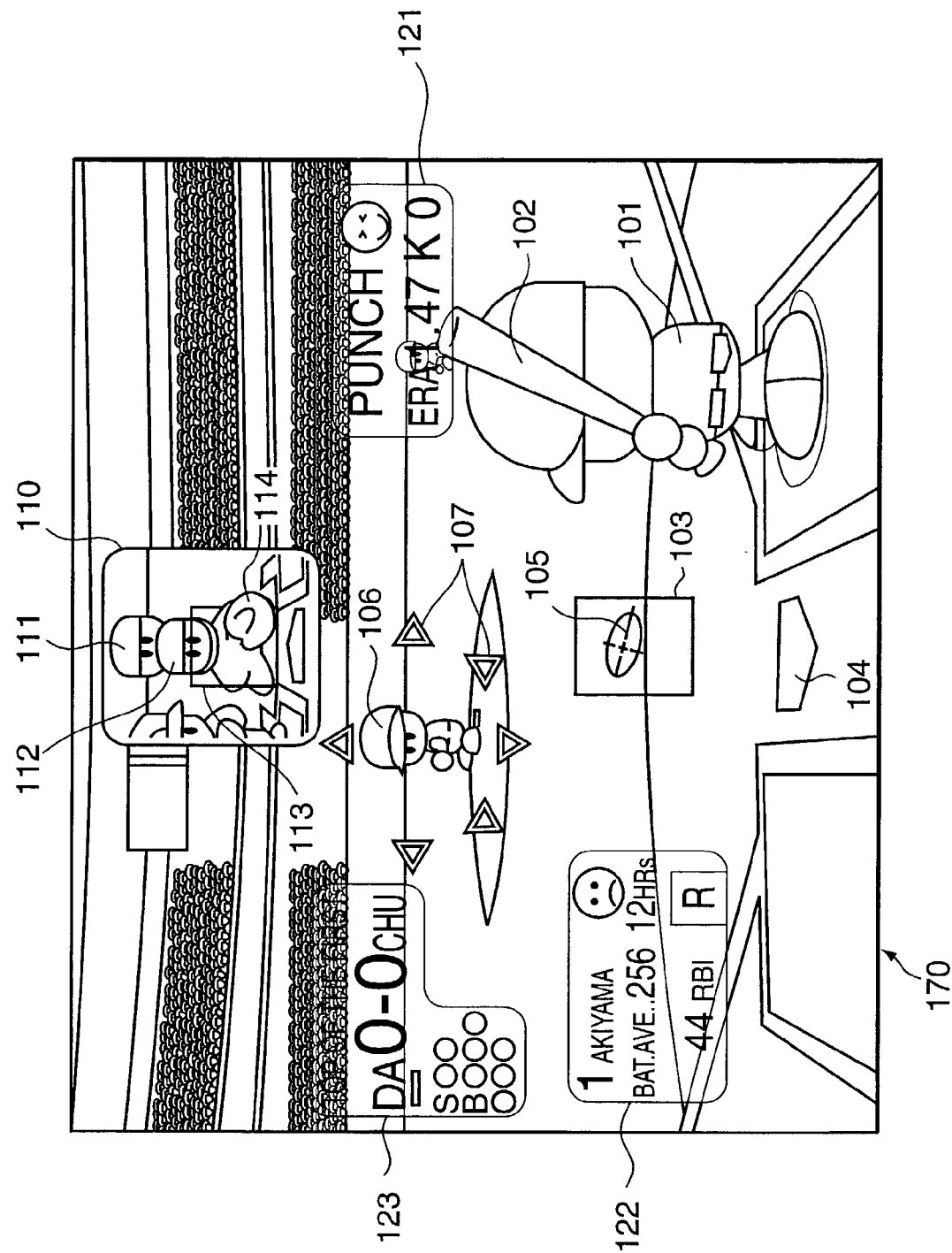
FIG. 8 is a competition screen shown on the monitor of a game system.

Next, the case in which operation of the keyboard 20 is used to determine the pitch course is explained, referring to the flow chart shown in FIG. 5, the key layout of the keyboard 20 shown in FIG. 6, and the screens shown in FIGS. 7 and 8. In the flow chart shown in FIG. 5, first, a judgment is made to determine whether the catcher's mitt character 114 is in motion due to a movement operation using the above mouse 22 (step ST51). If the catcher's mitt character 114 is in motion, processing returns. If the catcher's mitt character 114 is not in motion, a judgment is made to determine whether the center return key 201, which is a key used to set the home position of the catcher's mitt character 114 in the center of the strike zone 113, is depressed (here, it is assumed that the "X" key of the keyboard 20 shown in FIG. 6 has been set in advance as the center return key 201) (step ST53). If the result of this judgment is negative, processing proceeds to step ST59. If the result of this judgment is positive, the home position of the catcher's mitt character 114 is set to the center of the strike zone 113 (step ST55), and the catcher's miff character 114 is moved to the center of the strike zone 113, as shown in FIG. 7 (step ST57). The home position of the catcher's mitt character 114 is used as the initial position of the catcher's miff character 114 during the next pitch.

If the result of the judgment in step ST53 is negative, judgment is performed to determine whether the lower-right corner return key 202 (here it is assume that the "C" key of the keyboard 20 shown in FIG. 6 has been set in advance as the lower-right corner return key 202), used to set the home position of the catcher's mitt character 114 to the lower-right corner (if the batter character is a left-handed batter, a pitch low and to the outside) of the strike zone 113, has been depressed (step ST59). If the result of this judgment is negative, processing proceeds to step ST65. If the result is positive, the home position of the catcher's mitt character 114 is set to the lower-right corner of the strike zone 113 (step ST61), and the catcher's mitt character 114 is moved to the lower-right corner of the strike zone 113, as shown in FIG. 8 (step ST63).

If the result of the judgment of step ST59 is negative, judgment is performed to determine whether the upper-right corner return key 203 (here it is assume that the "D" key of the keyboard 20 shown in FIG. 6 has been set in advance as the upper-right corner return key 203), used to set the home position of the catcher's miff character 114 to the upper-right corner (if the batter character is a left-handed batter, a pitch high and to the outside) of the strike zone 113, has been depressed (step ST65). If the result of this judgment is negative, processing proceeds to step ST71. If the result is positive, the home position of the catcher's miff character 114 is set to the upper-right corner of the strike zone 113 (step ST67), and the catcher's mitt character 114 is moved to the upper-right corner of the strike zone 113, as shown in FIG. 8 (step ST69).

If the result of the judgment of step ST65 is negative, judgment is performed to determine whether the lower-left corner return key 204 (here it is assume that the "Z" key of the keyboard 20 shown in FIG. 6 has been set in advance as the lower-left corner return key 204), used to set the home position of the catcher's mitt character 114 to the lower-left corner (if the batter character is a left-handed batter, a pitch low and to the inside) of the strike zone 113, has been depressed (step ST71). If the result of this judgment is negative, processing proceeds to step ST77. If the result is positive, the home position of the catcher's mitt character 114 is set to the lower-left corner of the strike zone 113 (step ST73), and the catcher's miff character 114 is moved to the lower-left corner of the strike zone 113, as shown in FIG. 8 (step ST75).

If the result of the judgment of step ST71 is negative, judgment is performed to determine whether the upper-left corner return key 205 (here it is assume that the "S" key of the keyboard 20 shown in FIG. 6 has been set in advance as the upper-left corner return key 205), used to set the home position of the catcher's mitt character 114 to the upper-left corner (if the batter character is a left-handed batter, a pitch high and to the inside) of the strike zone 113, has been depressed (step ST77). If the result of this judgment is negative, processing returns. If the result is positive, the home position of the catcher's mitt character 114 is set to the upper-left corner of the strike zone 113 (step ST79), and the catcher's mitt character 114 is moved to the upper-left corner of the strike zone 113 (step ST81). Here the center return key 201, lower-right corner return key 202, upper-right corner return key 203, lower-left corner return key 204, and upper-left corner return key 205 are collectively called return keys. Also, the time during which the home position of the above catcher's mitt character 114 can be set is from the time an instruction to begin pitching is given in step ST11, until, a prescribed length of time later, the ball character is released from the pitcher character 106.

In this way, through a key operation of the keyboard 20, it is possible to set the home position of the catcher's miff character 114 which determines the position of the pitch course, and move to the home position, by a single keypress; hence the catcher's mitt character can be returned to the home position with ease similar to that of dedicated game equipment, in which return to a home position is possible by the player's removing a hand from a joystick or similar, so that operating properties are improved. As shown in FIG. 6, the "X" key which is the center return key 201, the "C" key which is the lower-right corner return key 202, the "D" key which is the upper-right corner return key 203, the "Z" key which is the lower-left corner return key 204, and the "S" key which is the upper-left corner return key 205, are keys which are in positions enabling accurate and easy operation by the player without looking using the index finger of the left hand, with the little finger of the left hand fixed at the left-hand edge of the keyboard 20; hence the left hand can be used to operate the return keys of the keyboard 20 while operating the mouse 22 with the right hand. The player can depress a return key on the keyboard 20 to issue an instruction for the general pitch course, and then move the mouse 22 to set the pitch course in detail. Also, because the home position of the catcher's mitt character 114 is set by depressing a return key on the keyboard 20, the initial position of the pitch course for subsequent pitches is determined by the newly set home position of the catcher's mitt character 114, so that if the pitch course is not to be changed significantly, it is easy to set the pitch course position.

Returning to the flow chart of FIG. 2, at a prescribed length of time after the instruction is given to start a pitch by the pitcher character 106 in step ST11, the ball character is released by the pitcher character 106 (step ST15). Next, a judgment is performed to determine whether the batter character 101 has swung the bat character 102 (step ST17). If the bat character 102 has been swung, the result (either a miss, a foul, a hit, an out, a home run, or similar) is judged (step ST19).

Then, a judgment is performed as to whether the judgment result of step ST19 is a miss or not (step ST21). If a miss, a strike screen (not shown) is displayed (step ST23), and processing returns. If the judgment result in step ST19 is not a miss, a judgment as to whether the judgment result in step ST19 is a foul or not is made (step ST25). If a foul, a foul screen (not shown) is displayed (step ST27), and processing returns. If not a foul, a judgment is performed as to whether the judgment result of step ST19 is an out or not (step ST29).

If the result is an out, an out screen (not shown) is displayed (step ST31), and processing returns. If not an out, a judgment is performed as to whether the judgment result of step ST19 is a home run (step ST33). If a home run, a home run screen (not shown) is displayed (step ST35), and processing returns. If not a home run, a hit screen (not shown) is displayed (step ST37), and processing returns.

Next, processing for the case in which the player team is on the offensive side (that is, the player character is the batter character) is explained, based on the flow chart of FIG. 9. All of the processing of the flow chart shown in FIG. 2 is executed by the offensive operation unit 3022. In the flow chart of FIG. 9, first a competition screen 100 such as that shown in FIG. 3 is displayed on the monitor 18 (step ST103). The competition screen 100 is the same as that described in the explanation of the flow chart of FIG. 2, and so is omitted. With the competition screen 100 shown in FIG. 3 displayed on the monitor 18, the pitcher character 106 begins pitching operation (ST105). Next, the player uses the mouse 22 and keyboard 20 to perform operations to change the position of the contact cursor 105 (step ST107).

First, the case in which the position of the contact cursor 105 is changed by moving the mouse 22 is explained. The direction and amount of movement of the contact cursor 105 is determined according to the direction and amount of movement of the mouse 22. Hence the contact cursor 105 can be moved in the direction and at the speed desired by the player. The position of the contact cursor 105 during swinging is used in judging the bat-ball contact, described below, and in calculating the flight distance (or strength of the hit) of the ball character and the flight (or rolling) direction. In other words, the contact cursor 105 is a character representing the contact position when the bat character 102 is swung. The size of the contact cursor 105 changes depending on the ability parameter of the batter character 101. That is, when a batter character 101 with a high ability parameter is batting, a large contact cursor 105 is displayed, and when a batter character 101 with a low ability parameter is batting, a small contact cursor 105 is displayed. The range of possible motion of the contact cursor 105 is substantially the range of the strike zone 113.

Figure 10:
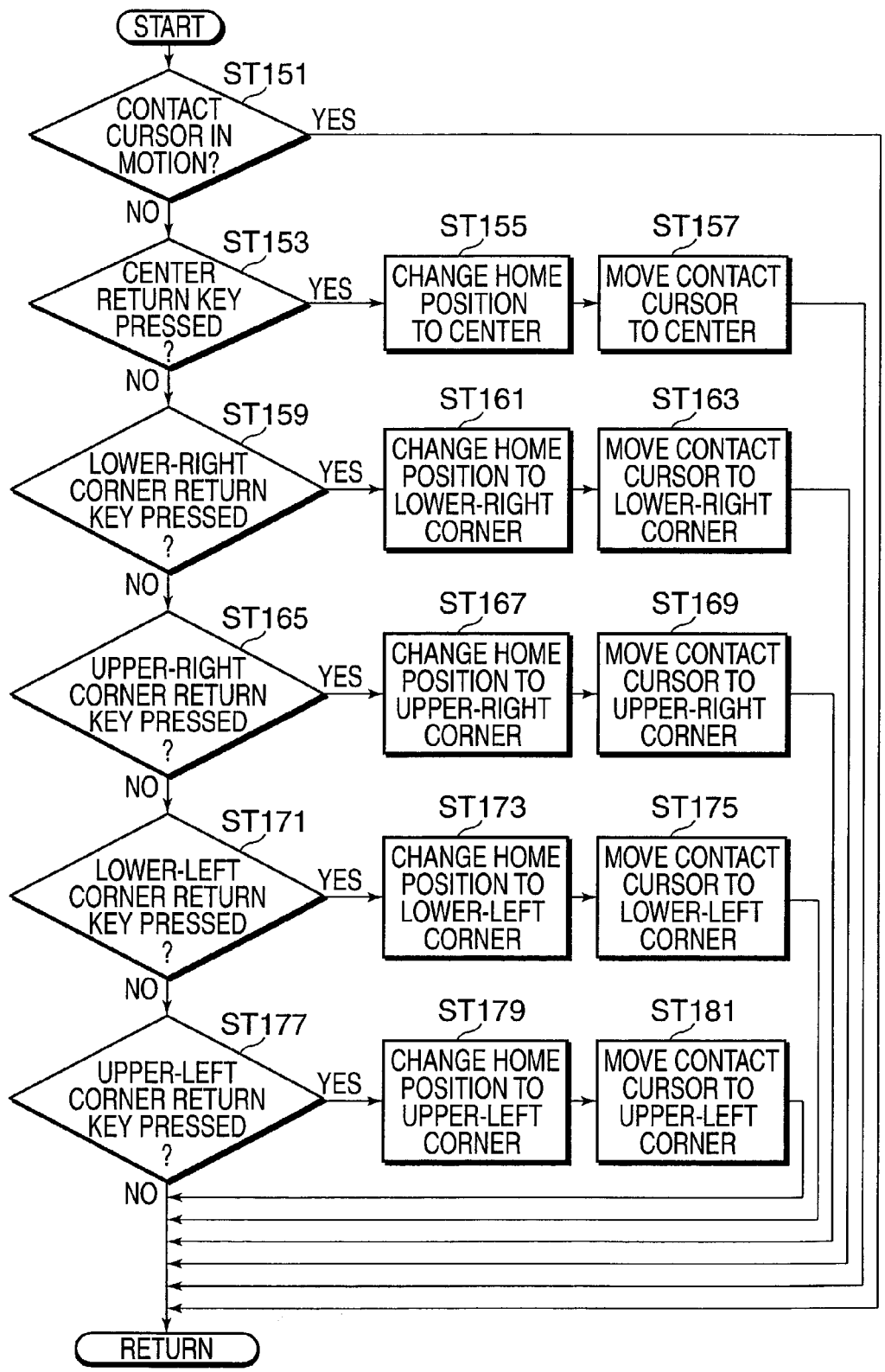
FIG. 10 is a detailed flow chart used to explain the operation of a game system when the player team is on the offensive side.
Figure 11:
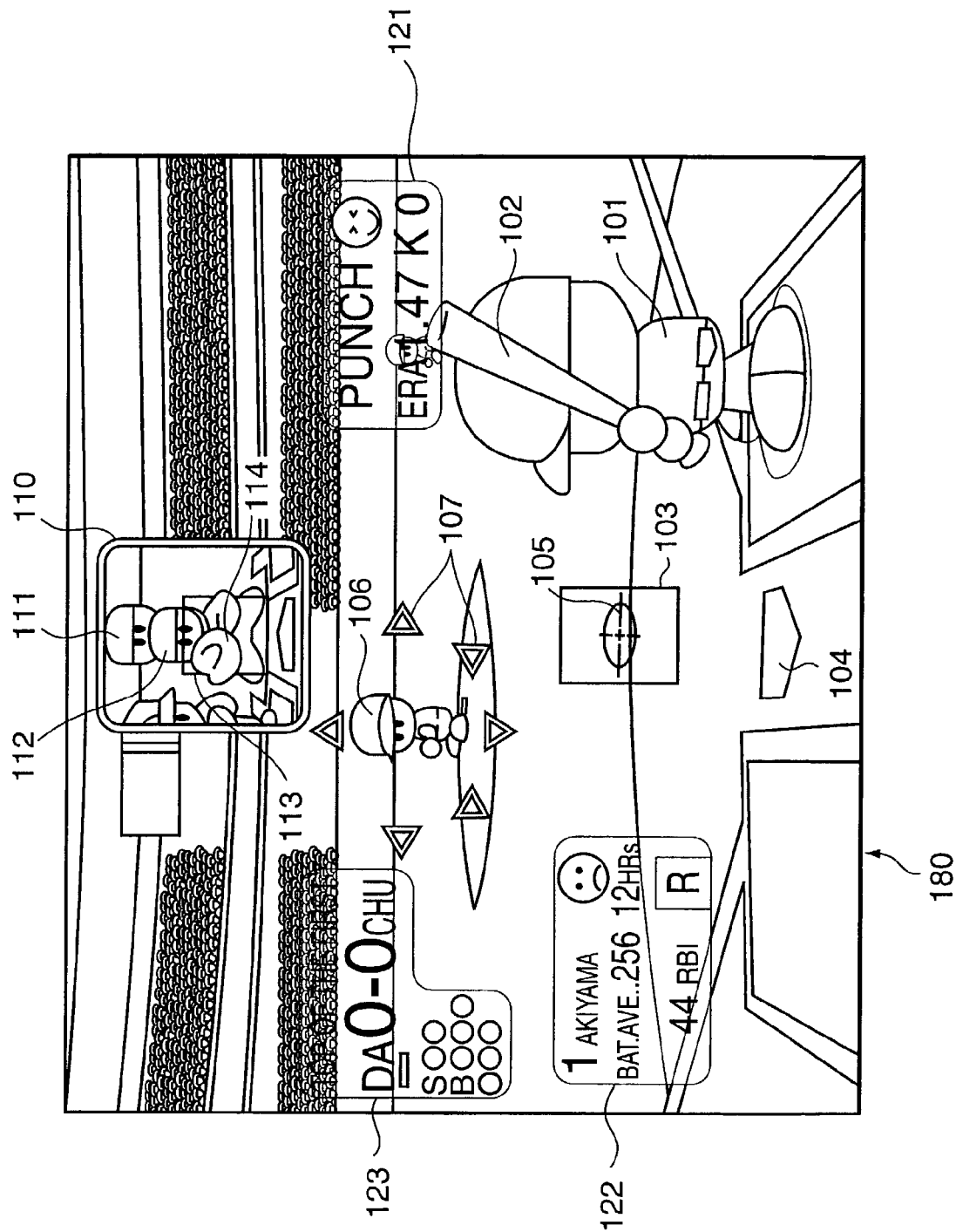
FIG. 11 is a competition screen shown on the monitor of a game system.
Figure 12:
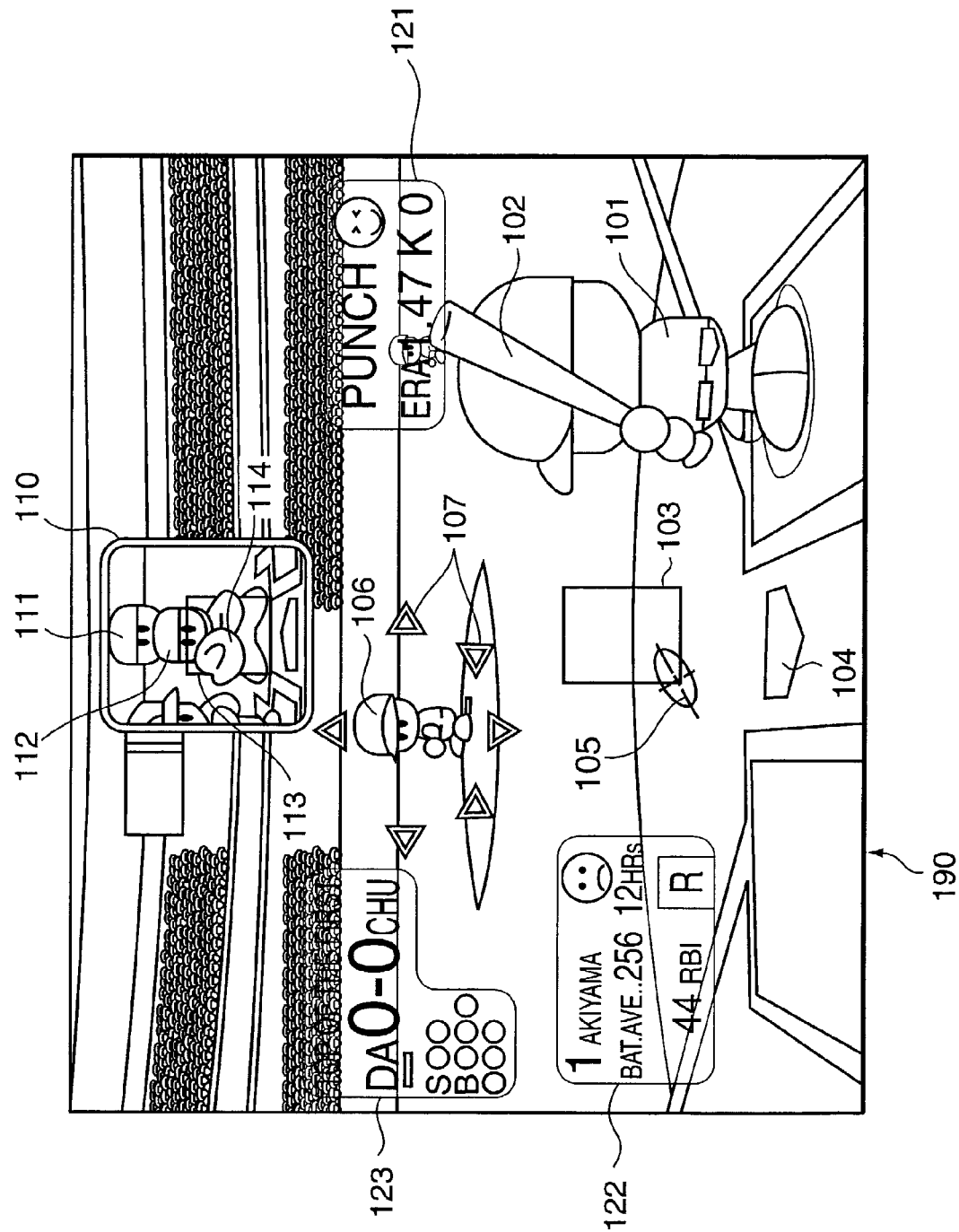
FIG. 12 is a competition screen shown on the monitor of a game system.

Next, the case in which the position of the contact cursor 105 is changed through operation of the keyboard 20 is explained, referring to the flow chart of FIG. 10, the key layout diagram of the keyboard 20 shown in FIG. 6, and the screens of FIGS. 11 and 12. In the flow chart shown in FIG. 10, first a judgment is performed to determine whether the contact cursor 105 is in motion through operation of the above mouse 22 (step ST151). If the contact cursor 105 is in motion, processing returns. If the contact cursor 105 is not in motion, judgment is performed to determine whether the center return key 201, which is a key used to set the home position of the contact cursor 105 in the center of the strike zone 113, is depressed (here, it is assumed that the "X" key of the keyboard 20 shown in FIG. 6 has been set in advance as the center return key 201) (step ST153). If the result of this judgment is negative, processing proceeds to step ST159. If the result of this judgment is positive, the home position of the contact cursor 105 is set to the center of the strike zone 113 (step ST155), and the contact cursor 105 is moved to the center of the strike zone 103, as shown in FIG. 11 (step ST157). The home position of the contact cursor 105 is used as the initial position of the contact cursor during the next pitch.

If the result of the judgment of step ST153 is negative, judgment is performed to determine whether the lower-right return key 202, which is a key used to set the home position of the contact cursor 105 in the lower-right corner (if the batter character is a left-handed batter, a pitch low and to the inside) of the strike zone 103, is depressed (here, it is assumed that the "C" key of the keyboard 20 shown in FIG. 6 has been set in advance as the lower-right corner return key 202) (step ST159). If the result of this judgment is negative, processing proceeds to step ST165. If the result of this judgment is positive, the home position of the contact cursor 105 is set to the lower-right corner of the strike zone 103 (step ST161), and the contact cursor 105 is moved to the lower-right corner of the strike zone 103 (step ST163).

If the result of the judgment of step ST159 is negative, judgment is performed to determine whether the upper-right return key 203, which is a key used to set the home position of the contact cursor 105 in the upper-right corner (if the batter character is a left-handed batter, a pitch high and to the inside) of the strike zone 103, is depressed (here, it is assumed that the "D" key of the keyboard 20 shown in FIG. 6 has been set in advance as the upper-right corner return key 203) (step ST165). If the result of this judgment is negative, processing proceeds to step ST171. If the result of this judgment is positive, the home position of the contact cursor 105 is set to the upper-right corner of the strike zone 103 (step ST167), and the contact cursor 105 is moved to the upper-right corner of the strike zone 103 (step ST169).

If the result of the judgment of step ST165 is negative, judgment is performed to determine whether the lower-left return key 204, which is a key used to set the home position of the contact cursor 105 in the lower-left corner (if the batter character is a left-handed batter, a pitch low and to the outside) of the strike zone 103, is depressed (here, it is assumed that the "Z" key of the keyboard 20 shown in FIG. 6 has been set in advance as the lower-left corner return key 204) (step ST171). If the result of this judgment is negative, processing proceeds to step ST177. If the result of this judgment is positive, the home position of the contact cursor 105 is set to the lower-left corner of the strike zone 103 (step ST173), and the contact cursor 105 is moved to the lower-left corner of the strike zone 103, as shown in FIG. 12 (step ST175).

If the result of the judgment of step ST171 is negative, judgment is performed to determine whether the upper-left return key 205, which is a key used to set the home position of the contact cursor 105 in the upper-left corner (if the batter character is a left-handed batter, a pitch high and to the outside) of the strike zone 103, is depressed (here, it is assumed that the "S" key of the keyboard 20 shown in FIG. 6 has been set in advance as the upper-left corner return key 205) (step ST177). If the result of this judgment is negative, processing returns. If the result of this judgment is positive, the home position of the contact cursor 105 is set to the upper-left corner of the strike zone 113 (step ST179), and the contact cursor 105 is moved to the upper-left corner of the strike zone 113 (step ST181). Here the center return key 201, lower-right corner return key 202, upper-right corner return key 203, lower-left corner return key 204, and upper-left corner return key 205 are collectively called return keys.

In this way, through a key operation of the keyboard 20, it is possible to set the home position of the contact cursor 105, and move to the home position, by a single keypress; hence the contact cursor can be returned to the home position with ease similar to that of dedicated game equipment, in which return to a home position is possible by the player's removing a hand from a joystick or similar, so that operating properties are improved. As shown in FIG. 6, the "X" key which is the center return key 201, the "C" key which is the lower-right corner return key 202, the "D" key which is the upper-right corner return key 203, the "Z" key which is the lower-left corner return key 204, and the "S" key which is the upper-left corner return key 205, are keys which are in positions enabling accurate and easy operation by the player without looking using the index finger of the left hand, with the little finger of the left hand fixed at the left-hand edge of the keyboard 20; hence the left hand can be used to operate the return keys of the keyboard 20 while operating the mouse 22 with the right hand. The player can depress a return key on the keyboard 20 to issue an instruction for the general position of the contact cursor, and then move the mouse 22 to set the exact position of the contact cursor. Also, because the home position of the contact cursor 105 is set by depressing a return key on the keyboard 20, the initial position of the contact cursor 105 for subsequent pitches is determined by the newly set home position of the contact cursor 105, so that if the position of the contact cursor 105 is not to be changed significantly, it is easy to set the position of the contact cursor 105.

Returning again to the flow chart of FIG. 9, the bat-ball contact between the ball character and the bat character 102 is judged, based on a judgment as to whether the player has issued an instruction to the batter character 101 to swing with the same timing with which the ball character, thrown by the pitcher character 106, passes over home base 104, as well as on a judgment as to whether there is coincidence in the position of the contact cursor 105 and the position of the ball character with this timing (step ST111). Here the player issues an instruction to the batter character 101 to swing using a button (for example, clicking the left button) of the mouse 22.

The method of judgment of the bat-ball contact in step ST111 is here explained. In the above timing judgment, a judgment of bat-ball contact is made depending on whether the player has issued an instruction to swing within a prescribed time range before and after the moment that the ball character passes over home base 104. That is, if the player has issued an instruction to swing within the prescribed time range, it is judged that bat-ball contact has occurred, and if the swing instruction was issued outside the above prescribed time range, it is judged that bat-ball contact has not occurred. On the other hand, in the above position judgment, bat-ball contact is judged based on whether the ball character passes through the substantially elliptically-shaped range of the contact cursor 105 at the time that the ball character passes over home base 104. In other words, if the ball character passes through the substantially elliptically-shaped range of the contact cursor 105, bat-ball contact is judged to have occurred, and if the ball character does not pass through the substantially elliptically-shaped range of the contact cursor 105, bat-ball contact is judged not to have occurred. In step ST111, if bat-ball contact is judged to occur in the above timing judgment, and moreover bat-ball contact is judged to occur in the above position judgment, then bat-ball contact is judged to occur; in all other cases, bat-ball contact is judged not to occur.

If in step ST111 bat-ball contact is judged not to have occurred, a judgment as to whether the current count of the strike counter is "2" is made (step ST113). If the count of the strike counter is "2", processing proceeds to step ST131. If the count of the strike counter is not "2", the strike counter is incremented ("1" is added) (step ST117), a strike screen is displayed (step ST119), and processing returns.

If in step ST111 bat-ball contact is judged to have occurred, calculations of the flight or rolling of the ball character after making contact with the bat character, and the strength of the flight (or rolling), are calculated based on the position of the substantially elliptically-shaped range of the contact cursor 105 through which the ball character passes at the time the ball character passes over home base 104; and the timing with which the ball character passes over home base 104 is compared with the timing with which the player has issued the swing instruction, to calculate the direction in which the ball character flies (or rolls) (step ST121).

Specifically, the smaller the distance from the center of the ball character to the center of the contact cursor 105 (the center of the crossmark in the contact cursor 105), the greater is the flight distance (or the strength of the hit), and if the center of the ball character is above the horizontal line of the crossmark in the contact cursor 105, the hit is judged to be a "fly", whereas if the center of the ball character coincides with or is below the horizontal line of the crossmark in the contact cursor 105, the hit is judged to be a "grounder". To judge the direction of the hit ball, when for example the batter character 101 is a right-handed batter, if the timing with which the ball character passes over home base 104 coincides with the timing with which the player issues a swing instruction, the direction is toward the center; if the timing with which the player issues a swing instruction is earlier than the timing with which the ball character passes over home base 104, the direction is toward the left; and if the timing with which the player issues a swing instruction is later than the timing with which the ball character passes over home base 104, the direction is toward the right.

Next, a judgment as to whether the hit is "fair" or not is made based on the direction of flight (or rolling) of the ball character calculated in step ST121 (step ST123). The judgment of whether a hit is "fair" or not in step ST123 is performed using a comparison of coordinates representing a game field having boundary lines between the "fair area" and "foul area" with the direction of flight (or rolling) of the ball character. If the hit is judged to be "fair" in step ST123, a judgment as to whether an "out" occurs is made based on the motion of the ball character and the positions of defenders (step ST125). A mode may be employed in which the ability parameter of the batter character 101 affects the judgment of whether an "out" occurs. If in step ST125 it is judged that an "out" does not occur, a judgment is made as to whether a home run occurs (ST139). If in step ST139 a home run is judged to have occurred, a home run screen (not shown) is displayed (step ST141), and processing returns. If in step ST139 is judged not to have occurred, a hit screen (not shown) is displayed (step ST143), and processing returns. On the other hand, if in step ST125 an "out" is judged to have occurred, processing proceeds to step ST131.

If in step ST123 it is judged that the hit is not "fair", a judgment as to whether an "out" has occurred is made based on the ball character movement and the positions of defenders (step ST129). If in step ST129 it is judged that an "out" has occurred, an out screen (not shown) is displayed (step ST131), and processing returns. If in step ST129 it is judged that an "out" has not occurred, a judgment as to whether the current count of the strike counter is "2" is made (step ST133). If the count of the strike counter is "2", processing proceeds to step ST137. If the count of the strike counter is not "2", the strike counter is incremented ("1" is added) (step ST135), a foul screen (not shown) is displayed (step ST137), and processing returns.

Figure 13:
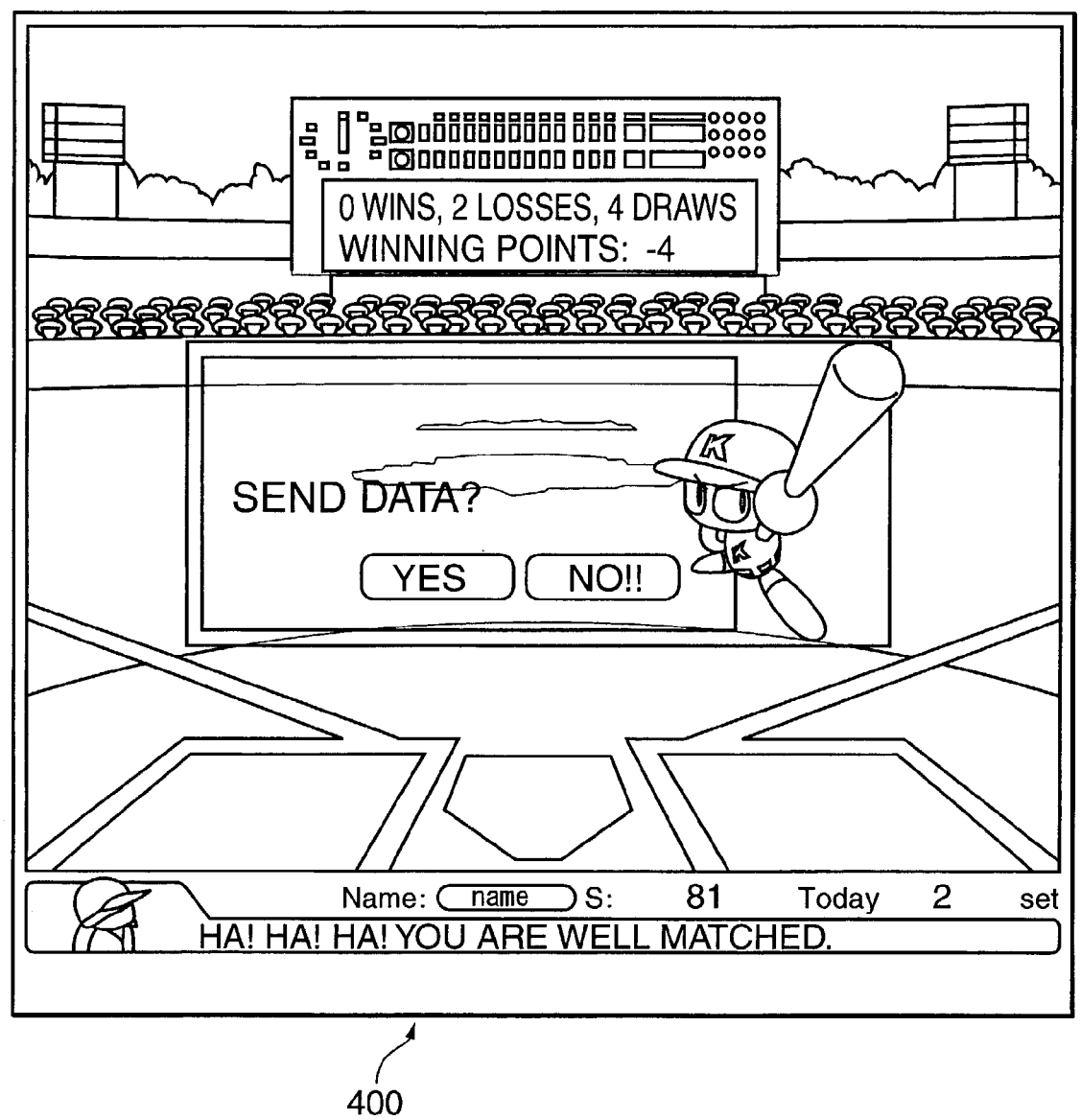
FIG. 13 is a data transmission screen, shown on the monitor of a game system; and, FIG. 14 is a game continuation screen, shown on the monitor of a game system.

As explained above, the baseball game is made to progress according to the flow charts shown in FIGS. 2 and 9, and when nine innings are completed (or, if the team which began the game on the defensive side is winning, when the top of the ninth inning is completed), a data transmission screen 400 like that shown in FIG. 13 is displayed. Here, if the "YES" button is clicked, the game results (that is, the "winning points" for the player team), the number of pitches thrown, earned-run average, and other data for the pitcher character 106 of the player team, and the batting average, number of home runs, and other batting results for the batter character 101 of the player team are transmitted from the computer 14 to the server device 16. The "winning points" for the player team, the pitching results for the pitcher character 106 of the player team, and the batting results for the batter character 101 and similar are calculated in advance by the computer 14; however, in this aspect the data is stored by the server device 16.

On the other hand, the "winning points" data transmitted from each computer 14 is stored in the storage unit 42 of the server device 16, and, for example, tallied in weekly and monthly units, to rank players. The results of this ranking are transmitted to each computer 14, either automatically or in response to player requests.

Figure 14:
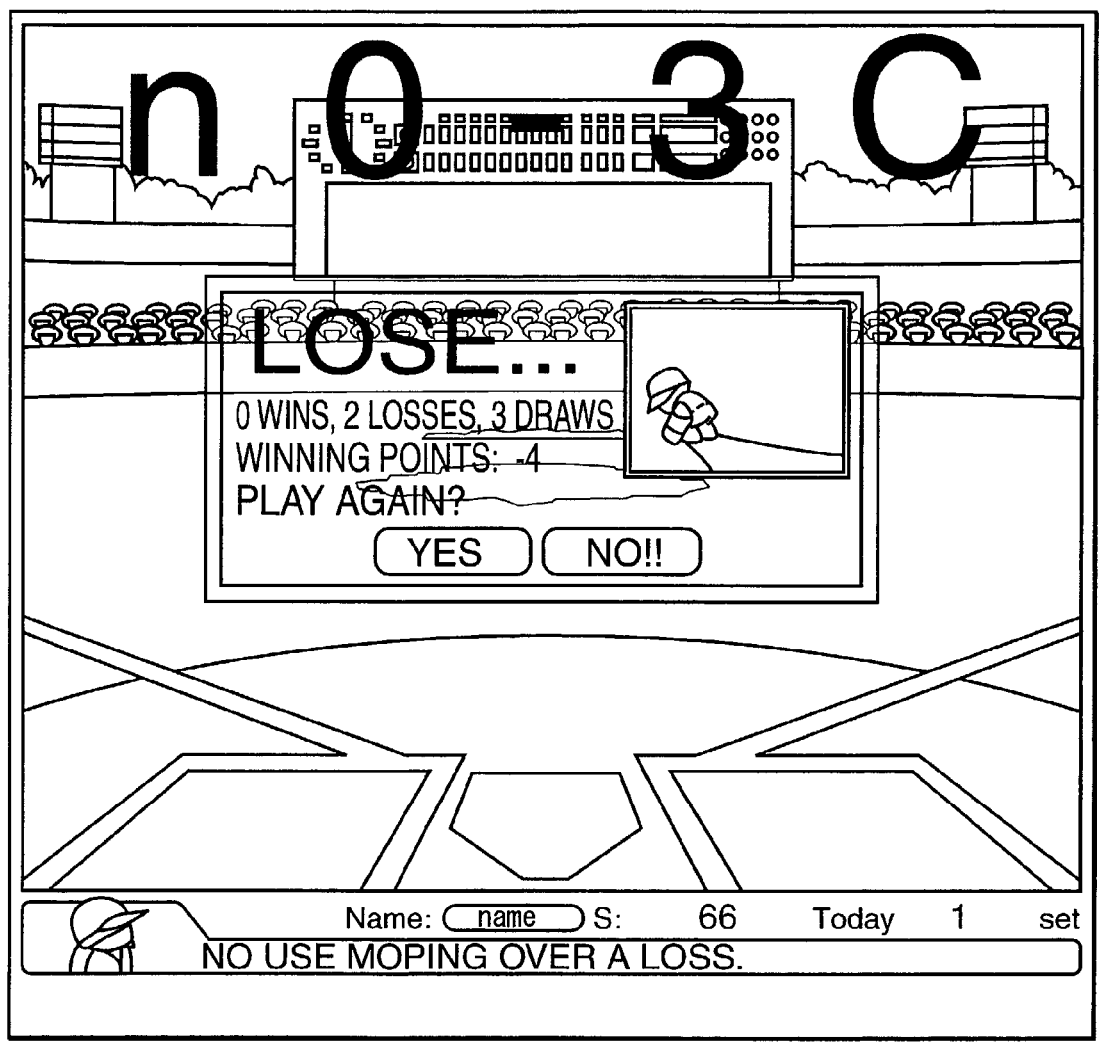

Prior to display of the data transmission screen 400, the game continuation screen 410 shown in FIG. 14 is displayed, and the player is asked whether he wishes to play another game; if "YES" is selected, another game can be played, and if "NO" is selected, the game session ends. If the player has lost in the previous contest "LOSE" is displayed, if the player has won, "WIN" is displayed, and if the result is a draw, "DRAW" is displayed.

Thus in this aspect, the player operates a pitcher character 106 and a batter character using the mouse 22 and keyboard 20 when playing a baseball game, so that the pitch course and the contact position when swinging the bat can be specified quickly and accurately, and the player can perform the intended pitching and batting actions. Employing computers 14 which are in wide use, the results of baseball games played on individual computers 14 can be centrally managed on a server device 16, based on a competition program distributed directly from the server device 16 or indirectly, and ranking displays based on these results are displayed, so that a competitive environment in which numerous persons can participate can easily be configured. Moreover, persons participating in the baseball game can understand their own results relative to those of all participants, so that motivation to continue the baseball game can be obtained; and, when certain fixed conditions are met, competition benefits can be obtained, providing an incentive to continue competition.

This invention can assume the following aspects.

(A) In this aspect, the case in which a mouse 22 is used as the pointing device was explained; but an aspect may be employed which uses a portable type trackball or portable type touch pad, or a similar pointing device which enables simultaneous input of the direction and amount of displacement of a pointer by a single operation, and signal input from which can be received with the timing of the operation.

(B) In this aspect, the case in which the game is a baseball game has been explained; but the game may be any game, such as soccer, in which a player team and computer control or an opposing team alternate between offense and defense via a ball character. If the game is a soccer game, an aspect may be employed in which, when the player team is on the offensive side, a prescribed key operation of the keyboard is accepted to return the home position of the shooting target to the center or one of the four corners of the goal area, and when the player team is on the defensive side, a prescribed key operation of the keyboard is accepted to return the home position of the goalkeeper defensive position to the center or one of the four corners of the goal area.

(C) In this aspect, the case in which the home position can be set to the center or to one of the four corners of the strike zone was explained; but an aspect is possible in which the home position is any one, at least, among the center and the four corners of the strike zone (for example, the strike zone center). In this case, processing is simplified.

(D) In this aspect, the case in which, during movement of the catcher's mitt character or contact cursor using the mouse or keyboard, setting of the home position of the catcher's mitt character or contact cursor using the keyboard is forbidden; however, an aspect is also possible in which the home position of the catcher's mitt character or contact cursor can be set even while the catcher's mitt character or contact cursor is being moved using the mouse or keyboard. In this case, processing is simplified.

(E) In this aspect, the case in which the function to set a single home position for the catcher's mitt character or contact cursor is assigned to a single key on the keyboard is explained; however, an aspect is also possible in which the function to set a single home position for the catcher's mitt character or contact cursor is assigned to a plurality of keys on the keyboard. In this case, even when a plurality of adjacent keys are depressed simultaneously (when operation is imprecise), the desired operation can be performed, so that operating properties are further improved.

(F) In this aspect, the server device and a personal computer are connected; but an aspect in which the personal computer is in a stand-alone state is also possible. In this case, the exchange of data between the personal computer and the service device is unnecessary.

In summary, one aspect of the invention relates to a recording medium which stores a game progress control program, which causes a game image including a plurality of characters to be displayed on the monitor screen of a computer, receives from a player instructions input by means of movement operations and button operations made with a pointing device or key operations made with a keyboard, and causes the game to progress through the alternation of offense and defense between a player team and a computer-controlled team, or an opposing player team, via a ball character; and is characterized in that, when the player team is the defensive side, the above computer functions as defense operation means, receiving instructions of defensive movements for a defense character using the above pointing device or keyboard, and causing the defense character to perform defensive movements; when the player team is the offensive side, the above computer functions as offense operation means, receiving instructions of offensive movements for an offense character using the above pointing device or keyboard, and causing the offense character to perform offensive movements; and, at least either the above defense operation means or the above offense operation means receives a prescribed key operation of the above keyboard, and causes the position of a prescribed character related to defense operation or to offense operation to be returned to a prescribed home position.

According to the invention as described in the above, a game progress control program, which causes a game image including a plurality of characters to be displayed on the monitor screen of a computer, receives from a player instructions input by means of movement operations and button operations made with a pointing device or key operations made with a keyboard, and causes the game to progress through the alternation of offense and defense between a player team and a computer-controlled team, or an opposing player team, via a ball character, and is characterized in that, when the player team is the defensive side, the computer functions as defense operation means, receiving instructions of defensive movements for a defense character using the pointing device or keyboard, and causing the defense character to perform defensive movements; when the player team is the offensive side, the computer functions as offense operation means, receiving instructions of offensive movements for an offense character using the pointing device or keyboard, and causing the offense character to perform offensive movements; and, at least either the defense operation means or the offense operation means receives a prescribed key operation of the keyboard, and causes the position of a prescribed character related to defense operation or to offense operation to be returned to a prescribed home position.

In other words, through the defense operation means, instruction operations for defense movement of the defense character using the pointing device or keyboard are accepted, and the defense character performs defensive movements; and, through the offense operation means, instruction operations for offense movement of the offense character using the pointing device or keyboard are accepted, and the offense character performs offensive movements. Also, at least either the defense operation means or the offense operation means receives a prescribed key operation of the keyboard, and causes the position of a prescribed character related to defense operation or to offense operation to be returned to a prescribed home position (the position used with the greatest frequency by the player).

Accordingly, when the position of a prescribed character relating to defensive operation or offensive operation is different from the home position due to operations using the pointing device or keyboard, if the player wishes to return the position of this prescribed character relating to defensive or offensive operation to the home position, a prescribed key operation of the keyboard is accepted to cause the position of the prescribed character relating to defensive or offensive operation to be returned to the prescribed home position, similarly to the case with dedicated game equipment in which the player can cause return to the home position by removing a hand from the joystick or similar; so that operating properties are improved.

In the above described invention, the above prescribed home position may be the substantial center of the range of possible motion of the above prescribed character.

According to the above feature, the prescribed home position is the substantial center of the range of possible motion of the prescribed character. In other words, because the home position, which is the position to which a prescribed character related to defensive or offensive operation is returned by the player's removing a hand from the joystick or similar of dedicated game equipment, is normally the substantial center of the range of possible motion of the prescribed character, operating properties similar to those of a joystick or similar are obtained.

In the above described invention, the above prescribed home position can be a prescribed position at an edge portion of the range of possible motion of the above prescribed character.

According to the above feature, the prescribed home position is a prescribed position at an edge portion of the range of possible motion of the prescribed character. In other words, because the home position can be set at a position desired by the player in an edge portion of the range of possible motion of the prescribed player, operating properties are further improved.

In the above invention, the above game may be a baseball game; the above defensive operation means accepts instructions for pitching movements by the pitcher character, input using the above pointing device or keyboard, and causes the pitcher character to make the pitching movements; the above offensive operation means accepts instructions for batting movements by the batter character, input using the above pointing device or keyboard, and causes the batter character to make the batting movements; and, at least either the above defense operation means or offense operation means receives a prescribed key operation of the above keyboard, and causes the position of the prescribed character related to pitching operation or to batting operation to be returned to a prescribed home position.

According to the aforementioned features, the game is a baseball game; the defensive operation means accepts instructions for pitching movements by the pitcher character, input using the pointing device or keyboard, and causes the pitcher character to make the pitching movements; the offensive operation means accepts instructions for batting movements by the batter character, input using the pointing device or keyboard, and causes the batter character to make the batting movements; and, at least either the defense operation means or offense operation means receives a prescribed key operation of the keyboard, and causes the position of the prescribed character related to pitching operation or to batting operation to be returned to a prescribed home position.

In other words, the defensive operation means accepts instructions for pitching movements by the pitcher character input using the pointing device or keyboard, and causes the pitcher character to make the pitching movements; and, the offensive operation means accepts instructions for batting movements by the batter character input using the pointing device or keyboard, and causes the batter character to make the batting movements. And, at least either the defense operation means or offense operation means receives a prescribed key operation of the keyboard, and causes the position of the prescribed character related to pitching operation or to batting operation to be returned to a prescribed home position.

Accordingly, when the position of a prescribed character related to pitching operation or to batting operation is different from the home position due to operation performed using the pointing device or keyboard, and the player wishes to return the position of the prescribed character related to pitching operation or to batting operation to the prescribed home position, a prescribed key operation of the keyboard is accepted causing the position of the prescribed character relating to pitching operation or to batting operation to be returned to the prescribed home position, similar to the manner in which return to home position can be performed by the player's removing a hand from the joystick or similar of dedicated game equipment; and consequently, operating properties are improved.

According to the invention as described in the above, the defensive operation means receives the above prescribed key operation of the keyboard, and returns the position of a catcher's mitt character, which determines the pitch course, to the center of the strike zone. Accordingly, the defensive operation means receives a prescribed key operation of the keyboard, and returns the position of a catcher's mitt character, which determines the pitch course, to the center of the strike zone. In other words, a prescribed key operation of the keyboard is received by the defensive operation means, and the position of the catcher's mitt character which determines the pitch course is returned to the center of the strike zone, which is the range of possible motion of the catcher's mitt character; hence when control of the pitcher character is poor, a key operation can be used to instantly return the position of the catcher's mitt character, which determines the pitch course, to the center of the strike zone, which has a high probability of indication as the pitch course.

Furthermore, in the above described invention, the above defensive operation means receives the above prescribed key operation of the keyboard, and is possible to return the position of the catcher's mitt, which determines the pitch course, to one of the four corners of the strike zone.

According to the above features, the defensive operation means receives the prescribed key operation of the keyboard, and returns the position of the catcher's mitt, which determines the pitch course, to one of the four corners of the strike zone. In other words, a prescribed key operation of the keyboard is received by the defensive operation means, and the position of the catcher's mitt character which determines the pitch course is returned to one of the four corners of the strike zone, which is the range of possible motion of the catcher's mitt character; hence when control of the pitcher character is good, a key operation can be used to instantly return the position of the catcher's mitt character, which determines the pitch course, to one of the four corners of the strike zone, which has a high probability of indication as the pitch course.

In addition, the above offensive operation means receives the above prescribed key operation from the keyboard, and is possible to return the position of the contact cursor, indicating the contact position during a swing of the bat character, to the center of the strike zone.

According to the above feature, the offensive operation means receives the prescribed key operation from the keyboard, and returns the position of the contact cursor, indicating the contact position during a swing of the bat character, to the center of the strike zone.

In other words, a prescribed key operation of the keyboard is received by the offensive operation means, and the position of the contact cursor, which is a character indicating the contact position during swinging of the bat character, is returned to the center of the strike zone, which is the range of possible motion of the contact cursor; hence when control of the pitcher character of the opposing team is poor or in other cases, a key operation can be used to instantly return the position of the contact cursor, which indicates the contact position during swinging of the bat character, to the center of the strike zone, which has a high probability of indication as the contact position during swinging of the bat character, so that operating properties are improved.

Moreover, the above offensive operation means receives the above prescribed key operation from the keyboard, and is possible to return the position of the contact cursor, indicating the contact position during a swing of the bat character, to one of the four corners of the strike zone.

With the above features, the offensive operation means receives the prescribed key operation from the keyboard, and returns the position of the contact cursor, indicating the contact position during a swing of the bat character, to one of the four corners of the strike zone.

Accordingly, a prescribed key operation of the keyboard is received by the offensive operation means, and the position of the contact cursor, which is a character indicating the contact position during swinging of the bat character, is returned to one of the four corners of the strike zone, which is the range of possible motion of the contact cursor; hence when control of the pitcher character of the opposing team is good, a key operation can be used to instantly return the position of the contact cursor, which indicates the contact position during swinging of the bat character, to one of the four corners of the strike zone, which has a high probability of indication as the contact position during swinging of the bat character, so that operating properties are improved.

The invention takes another form which is related to a game server device which can be accessed over a network from a computer operated by a player, and comprising computer-readable recording medium on which is recorded the game progress control program as described in the above passages.

According to the aforementioned invention, a game server device is characterized in being accessible over a network from a computer operated by a player, and in comprising computer-readable recording medium having any of the aforementioned features.

In other words, as a result of comprising computer-readable recording medium, a game server device enabling execution of games with good operating properties is realized.

The present invention also relates to a game progress control method, which causes a game image including a plurality of characters to be displayed on the monitor screen of a computer, receives from a player instructions input by means of movement operations and button operations made with a pointing device or key operations made with a keyboard, and causes the game to progress through the alternation of offense and defense between a player team and a computer-controlled team, or an opposing player team, via a ball character; and is characterized in that, when the player team is the defensive side, the above computer executes defense operation processing, receiving instructions of defensive movements for a defense character using the above pointing device or keyboard, and causing the defense character to perform defensive movements; when the player team is the offensive side, the above computer executes offense operation processing, receiving instructions of offensive movements for an offense character using the above pointing device or keyboard, and causing the offense character to perform offensive movements; and, at least either the above defense operation processing or the above offense operation processing receives a prescribed key operation of the above keyboard, and causes the position of a prescribed character related to defense operation or to offense operation to be returned to a prescribed home position.

According to the aforementioned form of the invention, a game progress control method, which causes a game image including a plurality of characters to be displayed on the monitor screen of a computer, receives from a player instructions input by means of movement operations and button operations made with a pointing device or key operations made with a keyboard, and causes the game to progress through the alternation of offense and defense between a player team and a computer-controlled team, or an opposing player team, via a ball character, is characterized in that when the player team is the defensive side, the computer executes defense operation processing, receiving instructions of defensive movements for a defense character using the pointing device or keyboard, and causing the defense character to perform defensive movements; when the player team is the offensive side, the computer executes offense operation processing, receiving instructions of offensive movements for an offense character using the pointing device or keyboard, and causing the offense character to perform offensive movements; and, at least either the defense operation processing or the offense operation processing receives a prescribed key operation of the keyboard, and causes the position of a prescribed character related to defense operation or to offense operation to be returned to a prescribed home position.

In other words, in defense operation processing, instruction operations for defense movement of the defense character using the pointing device or keyboard are accepted, and the defense character performs defensive movements; and, in offense operation processing, instruction operations for offense movement of the offense character using the pointing device or keyboard are accepted, and the offense character performs offensive movements. Also, at least either the defense operation processing or the offense operation processing receives a prescribed key operation of the keyboard, and causes the position of a prescribed character related to defense operation or to offense operation to be returned to a prescribed home position (the position used with the greatest frequency by the player).

Accordingly, when the position of a prescribed character relating to defensive operation or offensive operation is different from the home position due to operations using the pointing device or keyboard, if the player wishes to return the position of this prescribed character relating to defensive or offensive operation to the home position, a prescribed key operation of the keyboard is accepted to cause the position of the prescribed character relating to defensive or offensive operation to be returned to the prescribed home position, similarly to the case with dedicated game equipment in which the player can cause return to the home position by removing a hand from the joystick or similar; so that operating properties are improved.

The present invention, moreover, relates to a game progress control device, which causes a game image including a plurality of characters to be displayed on the monitor screen of a computer, receives from a player instructions input by means of movement operations and button operations made with a pointing device or key operations made with a keyboard, and causes the game to progress through the alternation of offense and defense between a player team and a computer-controlled team, or an opposing player team, via a ball character. The game progress control device comprises: defense operation means, which, when the player team is the defensive side, receives instructions of defensive movements for a defense character using the above pointing device or keyboard, and causes the defense character to perform defensive movements; and, offensive operation means, which, when the player team is the offensive side, receives instructions of offensive movements for an offense character using the above pointing device or keyboard, and causes the offense character to perform offensive movements; and characterized in that at least either the above defense operation means or the above offense operation means receives a prescribed key operation of the above keyboard, and causes the position of a prescribed character related to defense operation or to offense operation to be returned to a prescribed home position.

According to the invention as described in the above, a game progress control device, which causes a game image including a plurality of characters to be displayed on the monitor screen of a computer, receives from a player instructions input by means of movement operations and button operations made with a pointing device or key operations made with a keyboard, and causes the game to progress through the alternation of offense and defense between a player team and a computer-controlled team, or an opposing player team, via a ball character; comprises defense operation means, which, when the player team is the defensive side, receives instructions of defensive movements for a defense character using the pointing device or keyboard, and causes the defense character to perform defensive movements, and offensive operation means, which, when the player team is the offensive side, receives instructions of offensive movements for an offense character using the pointing device or keyboard, and causes the offense character to perform offensive movements; and is characterized in that at least either the defense operation means or the offense operation means receives a prescribed key operation of the keyboard, and causes the position of a prescribed character related to defense operation or to offense operation to be returned to a prescribed home position.

In other words, through the defense operation means, instruction operations for defense movement of the defense character using the pointing device or keyboard are accepted, and the defense character performs defensive movements; and, through the offense operation means, instruction operations for offense movement of the offense character using the pointing device or keyboard are accepted, and the offense character performs offensive movements. Also, at least either the defense operation means or the offense operation means receives a prescribed key operation of the keyboard, and causes the position of a prescribed character related to defense operation or to offense operation to be returned to a prescribed home position (the position used with the greatest frequency by the player).

Accordingly, when the position of a prescribed character relating to defensive operation or offensive operation is different from the home position due to operations using the pointing device or keyboard, if the player wishes to return the position of this prescribed character relating to defensive or offensive operation to the home position, a prescribed key operation of the keyboard is accepted to cause the position of the prescribed character relating to defensive or offensive operation to be returned to the prescribed home position, similarly to the case with dedicated game equipment in which the player can cause return to the home position by removing a hand from the joystick or similar; so that operating properties are improved.

The invention, furthermore, relates to a recording medium storing a game progress control program, which causes a game image including a plurality of characters to be displayed on the monitor screen of a computer, receives from a player instructions input by means of movement operations and button operations made with a pointing device or key operations made with a keyboard, and causes the game to progress; and is characterized in that the above computer is made to function as movement operation means, which receives instructions, input using the above pointing device or keyboard, relating to the movements of at least one character among the above plurality of characters, and causes the above character to perform movements; and, the above computer is made to function as position return means, which receives a prescribed key instruction from the above keyboard, and causes the position of the moving character capable of motion associated with instructions relating to the motion of the above character to be returned to a prescribed home position.

According to the invention as described in the above, a game progress control program stored in the recording medium, which causes a game image including a plurality of characters to be displayed on the monitor screen of a computer, receives from a player instructions input by means of movement operations and button operations made with a pointing device or key operations made with a keyboard, and causes the game to progress; and the computer is made to function as movement operation means, which receives instructions, input using the pointing device or keyboard, relating to the movements of at least one character among the plurality of characters, and causes the character to perform movements; and, the computer is made to function as position return means, which receives a prescribed key instruction from the keyboard, and causes the position of the moving character, capable of motion associated with instructions relating to the motion of the character, to be returned to a prescribed home position.

In other words, through the movement operation means, instructions relating to movement of at least one character among the plurality of characters are received from the pointing device or keyboard, this character performs the movements, and through the position return means, a prescribed key operation of the keyboard is received, and the position of the moving character, capable of motion associated with instructions relating to the motion of the character, to be returned to a prescribed home position (the position used with the greatest frequency by the player).

Accordingly, when the position of a moving character is different from the home position due to operations using the pointing device or keyboard, if the player wishes to return the position of this moving character to the home position, a prescribed key operation of the keyboard is accepted to cause the position of the moving character to be returned to the prescribed home position, similarly to the case with dedicated game equipment in which the player can cause return to the home position by removing a hand from the joystick or similar; so that operating properties are improved.

This application is based on Japanese patent application serial no. 2001-217834, filed in Japan Patent Office on Jul. 18, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A recording medium storing an executable game progress control program which configures a computer device to drive a display, accept input from a player via a keyboard and via a pointing device, and to operate as an apparatus, wherein the apparatus as configured by the game progress control program comprises:
    a display device displaying on the display a game image including a plurality of characters;
    an input device receiving from a player an instruction input by means of movement operation and button operation made with the pointing device or key operation made with the keyboard;
    a game execution device operating to execute a game which progresses through alternation of offense and defense between a player team and a computer-controlled team, or an opposing player team, using a ball character wherein said game execution device includes:
    defense operation means receiving, via said input device, an instruction of defensive movement for a defense character using said pointing device or said keyboard, and in response thereto causing the defense character to perform a defensive movement when the player team is the defensive side;
    offense operation means receiving, via said input device, an instruction of offensive movement for an offense character using said pointing device or said keyboard, and in response thereto causing the offense character to perform an offensive movement when the player team is the offensive side; and
    at least either said defense operation means or said offense operation means functioning to receive, via said input device, a prescribed key operation of said keyboard and, in response to the prescribed key operation, operating to effect the following:
    move a position of a prescribed character related to a game action, which is a corresponding one of a defense operation or an offense operation, from a position displaced from a position occupied at a beginning of a control period of the game action, to a prescribed home position after initiation of the control period of the game action and prior to completion of the control period, and
    locate the prescribed character at said prescribed home position at a beginning of at least a following occurrence of said control period, wherein:
    said keyboard includes a set of predefined keys;
    said display includes positions at locations differing from each other and which compose a set of home positions; and
    each of said set of predefined keys of said keyboard is operable to effect said prescribed key operation, each of said predefined keys is mapped to one of said set of home positions assigned thereto, and operation of any of said predefined keys as said prescribed key operation functions to move the position of the prescribed character to the mapped set of home positions assigned to an operated one of said set of predefined keys each time said operated one of said set of predefined keys is depressed after the initiation of the control period of the game action and prior to the completion of the control period.

2. The recording medium according to claim 1, wherein said set of home positions includes a substantial center of a range of possible motion of said prescribed character.

3. The recording medium according to claim 1, wherein said set of home positions includes a prescribed position at an edge portion of a range of possible motion of said prescribed character.

4. The recording medium according to claim 1, wherein:
    said game is a baseball game;
    said defensive operation means accepts the instruction for a pitching movement by a pitcher character as the game action and in response thereto causes the pitcher character to make the pitching movement; and
    said offensive operation means accepts the instruction for a batting movement by a batter character as the game action and in response thereto causes the batter character to make the batting movement.

5. The recording medium according to claim 4, wherein said defensive operation means receives said prescribed key operation of the keyboard, and in response thereto returns a position of a catcher's mitt character as the prescribed character to the prescribed home position which is one of said set of home positions that is at a center of a strike zone to set a pitch course to the center or the strike zone.

6. The recording medium according to claim 4, wherein said defensive operation means receives said prescribed key operation from the keyboard, and in response thereto returns a position of a catcher's mitt character as the prescribed character to the prescribed home position, said set of home positions includes each of four corners of a strike zone to set a pitch course to any or the four corners of the strike zone, and the prescribed home position is selectable from among said four corners based on which of said set of predefined keys is operated to effect the prescribed key operation.

7. The recording medium according to claim 4, wherein said offensive operation means receives said prescribed key operation from the keyboard, and in response thereto returns a position of a contact cursor as the prescribed character to the prescribed home position which is one of said set of home positions that is a center of a strike zone to set a contact position of a swing of a bat character to the center of the strike zone.

8. The recording medium according to claim 4, wherein said offensive operation means receives said prescribed key operation from the keyboard, and in response thereto returns a position of a contact cursor as the prescribed character to the prescribed home position, said set of home positions includes each of four corners of a strike zone to set a contact position of a swing of a bat character to any of the four corners of the strike zone, and the prescribed home position is selectable from among said four corners based on which of said set of predefined keys is operated to effect the prescribed key operation.

9. The recording medium according to claim 1, wherein said prescribed character is movable to the position displaced from the position occupied at the beginning of the control period in accordance with a direction of movement of said movement operation of said pointing device and prior to said prescribed key operation.

10. A game server device, which can be accessed over a network from a computer device operated by a player, said game server device comprising;
    a recording medium storing an executable game progress control program, which configures a computer device to drive a display, accept input from a player via a keyboard and via a pointing device, and to operate as an apparatus, wherein the apparatus as configured by the game progress control program comprises:
        a display device displaying on the display a game image including a plurality of characters;
        an input device receiving from a player an instruction input by means of movement operation and button operation made with the pointing device or key operation made with the keyboard;
        a game execution device operating to execute a game which progresses through alternation of offense and defense between a player team and a computer-controlled team, or an opposing player team, using a ball character; wherein said game execution device includes:
            defense operation means receiving, via said input device, an instruction of defensive movement for a defense character using said pointing device or said keyboard, and in response thereto causing the defense character to perform a defensive movement when the player team is the defensive side;
            offense operation means receiving, via said input device, an instruction of offensive movement for an offense character using said pointing device or said keyboard, and in response thereto causing the offense character to perform an offensive movement when the player team is the offensive side; and
            at least either said defense operation means or said offense operation means functioning to receive, via said input device, a prescribed key operation of said keyboard and, in response to the prescribed key operation, operating to effect the following:
                move a position of a prescribed character related to a game action, which is a corresponding one of a defense operation or an offense operation, from a position displaced from a position occupied at a beginning of a control period of the game action, to a prescribed home position after initiation of the control period of the game action and prior to completion of the control period, and
                locate the prescribed character at said prescribed home position at a beginning of at least a following occurrence of said control period, wherein:
                    said keyboard includes a set of predefined keys;
                    said display includes positions at locations differing from each other and which compose a set of home positions; and
                each of said set of predefined keys of said keyboard is operable to effect said prescribed key operation, each of said predefined keys is mapped to one of said set of home positions assigned thereto, and operation of any of said predefined keys as said prescribed key operation functions to move the position of the prescribed character to the mapped set of home positions assigned to an operated one of said set of predefined keys each time said operated one of said set of predefined keys is depressed after the initiation of the control period of the game action and prior to the completion of the control period; and
    a program distributing device for distributing said game progress control program to said computer device via the network.

11. The game server device having the recording medium according to claim 10, wherein said prescribed character is movable to the position displaced from the position occupied at the beginning of the control period in accordance with a direction of movement of said movement operation of said pointing device and prior to said prescribed key operation.

12. A game progress control method of controlling a computer device to drive a display, accept input from a player via a keyboard and via a pointing device, and the method comprising:
    displaying on the display a game image including a plurality of characters;
    receiving from a player an instruction input by means of movement operation and button operation made with the pointing device or key operation made with the keyboard;
    executing a game on the computer device which progresses through alternation of offense and defense between a player team and a computer-controlled team, or an opposing player team, using a ball character; wherein:
        when the player team is the defensive side, said computer device executes defense operation processing, receiving an instruction of defensive movement for a defense character using said pointing device or said keyboard, and in response thereto causing the defense character to perform a defensive movement;
        when the player team is the offensive side, said computer device executes offense operation processing, receiving an instruction of offensive movement for an offense character using said pointing device or said keyboard, and in response thereto causing the offense character to perform an offensive movement; and,
        at least either said defense operation processing or said offense operation processing functioning to receive a prescribed key operation of said keyboard and, in response to the prescribed key operation, operating to effect the following:
            move a position of a prescribed character related to a game action, which is a corresponding one of a defense operation or an offense operation, from a position displaced from a position occupied at a beginning of a control period of the game action, to a prescribed home position after initiation of the control period of the game action and prior to completion of the control period, and locate the prescribed character at said prescribed home position at a beginning of at least a following occurrence of said control period, wherein:

said keyboard includes a set of predefined keys;

said display includes positions at locations differing from each other and which compose a set of home positions; and each of said set of predefined keys of said keyboard is operable to effect said prescribed key operation, each of said predefined keys is mapped to one of said set of home positions assigned thereto, and operation of any of said predefined keys as said prescribed key operation functions to move the position of the prescribed character to the mapped set of home positions assigned to an operated one of said set of predefined keys each time said operated one of said set of predefined keys is depressed after the initiation of the control period of the game action and prior to the completion of the control period.

13. The game server device having the recording medium according to claim 12, wherein said prescribed character is movable to the position displaced from the position occupied at the beginning of the control period in accordance with a direction of movement of said movement operation of said pointing device and prior to said prescribed key operation.

14. A game progress control device, which controls a computer device to drive a display, accept input from a player via a keyboard and via a pointing device, and to operate as an apparatus comprising:

a display device displaying on the display a game image including a plurality of characters;

an input device receiving from a player an instruction input by means of movement operation and button operation made with the pointing device or key operation made with the keyboard;

a game execution device operating to execute a game which progresses though alternation of offense and defense between a player team and a computer-controlled team, or an opposing player team, using a ball character wherein said game execution device comprises:

defense operation means receiving, via said input device, an instruction of defensive movement for a defense character using said pointing device or said keyboard, and in response thereto causes the defense character to perform a defensive movement when the player team is the defensive side; and, offensive operation means receiving, via said input device, an instruction of offensive movement for an offense character using said pointing device or said keyboard, and in response thereto causes the offense character to perform an offensive movement when the player team is the offensive side; and at least either said defense operation means or said offense operation means functioning to receive, via said input device, a prescribed key operation of said keyboard and, in response to the prescribed key operation, operating to effect the following:

move a position of a prescribed character related to a game action, which is a corresponding one of a defense operation or an offense operation, from a position displaced from a position occupied at a beginning of a control period of the game action, to a prescribed home position after initiation of the control period of the game action and prior to completion of the control period, and locate the prescribed character at said prescribed home position at a beginning of at least a following occurrence of said control period, wherein:

said keyboard includes a set of predefined keys;

said display includes positions at locations differing from each other and which compose a set of home positions; and each of said set of predefined keys of said keyboard is operable to effect said prescribed key operation, each of said predefined keys is mapped to one of said set of home positions assigned thereto, and operation of any of said predefined keys as said prescribed key operation functions to move the position of the prescribed character to the mapped set of home positions assigned to an operated one of said set of predefined keys each time said operated one of said set of predefined keys is depressed after the initiation of the control period of the game action and prior to the completion of the control period.

15. The game server device having the recording medium according to claim 14, wherein said prescribed character is movable to the position displaced from the position occupied at the beginning of the control period in accordance with a direction of movement of said movement operation of said pointing device and prior to said prescribed key operation.

16. A game system recording medium storing a game progress control program in executable form for controlling a computer to execute a game including performance of the following:

displaying a game image on a display, the game image including a controlled game character controlled by a player during prescribed periods corresponding to each of a series of game control operations, wherein at a beginning each of the game control operations the game character is oriented at an initial home position;

receiving character control instructions input by the player using:

a pointing device inputting directional movement operations and button operations as said character control instructions; and a keyboard inputting key operations as said character control instructions, the key operations including multiple home key operations, each of the multiple home key operations being effected by the player striking a corresponding key of a plurality of home keys and each of the home keys having a corresponding home position assigned thereto, the home positions being different from each other and each of the home positions is located at a predefined positions of the display, and the home positions composing a set of home positions; and controlling said controlled game character displayed including:

displaying said controlled game character on said display at said initial home position at a beginning each of said prescribed periods;

moving said controlled game character on said display from said initial home position during each of said game control operations in accordance with said character control instructions input by said player; and moving said controlled game character on said display to one of said set of home positions, in response to receiving one of said multiple home key operations of a corresponding one of said home keys input by the player at a time which is:
    after said controlled game character is moved from said initial home position in accordance with said character control instructions input by said player; and
    prior to completion of a given one of said prescribed periods; and
displaying said controlled game character on said display at said initial home position at a beginning of a next one of said prescribed periods, wherein:
said receiving includes receiving said multiple key operations;
said controlling includes:
    revising said initial home position to another one of said home positions corresponding to a last received one of said multiple home key operations;
    moving said controlled game character on said display to said initial home position as revised in response to receiving said last received one of said multiple home key operations and prior to completion of a given one of said prescribed periods; and
    using said initial home position as revised as the initial home position at said beginning of a next one of said prescribed periods.

17. The recording medium according to claim 16, wherein said controlling said controlled game character includes controlling said game character to move in a direction corresponding to a direction of movement of said directional movement operations.

18. The recording medium according to claim 17, wherein said controlling gives priority to said directional moving operations over said keyboard operations.

19. The recording medium according to claim 18, wherein said prescribed periods are time periods.

20. The recording medium according to claim 16, wherein said controlling gives priority to said directional moving operations over said keyboard operations.

21. The recording medium according to claim 20, wherein said prescribed periods are time periods.

22. The recording medium according to claim 16, wherein said controlled game character is movable from said initial home position in accordance with said character control instructions input by said player using said pointing device to input said directional movement operations and prior to controlling the controlled game character in response to any of said multiple home key operations.

23. A recording medium storing an executable game progress control program which configures a computer device to drive a display, accept input from a player via a keyboard and via a pointing device, and to operate as an apparatus, wherein the apparatus as configured by the game progress control program comprises:
a display device displaying on the display a game image including a plurality of characters;
an input device receiving from a player an instruction input by means of movement operation and button operation made with the pointing device or key operation made with the keyboard;
a game execution device operating to execute a game which progresses through alternation of offense and defense between a player team and a computer-controlled team, or an opposing player team, using a ball character wherein said game execution device includes:
defense operation means receiving, via said input device, an instruction of defensive movement for a defense character using said pointing device or said keyboard, and in response thereto causing the defense character to perform a defensive movement when the player team is the defensive side;
offense operation means receiving, via said input device, an instruction of offensive movement for an offense character using said pointing device or said keyboard, and in response thereto causing the offense character to perform an offensive movement when the player team is the offensive side; and
at least either said defense operation means or said offense operation means functioning to receive, via said input device, a prescribed key operation of said keyboard and, in response to the prescribed key operation, operating to effect the following:
    move a position of a prescribed character related to a game action, which is a corresponding one of a defense operation or an offense operation, from a position displaced from a position occupied at a beginning of a control period of the game action, to a prescribed home position after initiation of the control period of the game action and prior to completion of the control period, and
    locate the prescribed character at said prescribed home position at a beginning of at least a following occurrence of said control period, wherein:
said keyboard includes a set of predefined keys;
said display includes positions at locations differing from each other and which compose a set of home positions; and
each of said set of predefined keys of said keyboard is operable to effect said prescribed key operation, each of said predefined keys is mapped to one of said set of home positions assigned thereto, and operation of any of said predefined keys as said prescribed key operation functions to move the position of the prescribed character to the mapped set of home positions assigned to an operated one of said set of predefined keys after the initiation of the control period of the game action and prior to the completion of the control period each time said operated one of said set of predefined keys is depressed after the initiation of the control period of the game action and prior to the completion of the control period and said prescribed key operation being for each instance a single depression of one said predefined keys.

24. The recording medium according to claim 23, wherein:
said game is a baseball game;
said defensive operation means accepts the instruction for a pitching movement by a pitcher character as the game action and in response thereto causes the pitcher character to make the pitching movement;
said offensive operation means accepts the instruction for a batting movement by a batter character as the game action and in response thereto causes the batter character to make the batting movement;
said defensive operation means receives said prescribed key operation from the keyboard, and in response thereto returns a position of a catcher's mitt character as the prescribed character to the prescribed home position, said catchers mitt determining a strike zone pitch position of a pitch course produced by the pitching movement; and said set of home positions includes each of four corners of a strike zone to set said strike zone pitch position to any of the four corners of the strike zone, and the prescribed home position is selectable from among said four corners based on which of said set of predefined keys is operated to effect the prescribed key operation.

25. The recording medium according to claim 23, wherein:

said game is a baseball game;

said defensive operation means accepts the instruction for a pitching movement by a pitcher character as the game action and in response thereto causes the pitcher character to make the pitching movement;

said offensive operation means accepts the instruction for a batting movement by a batter character as the game action and in response thereto causes the batter character to make the batting movement;

said offensive operation means receives said prescribed key operation from the keyboard, and in response thereto returns a position of a contact cursor as the prescribed character to the prescribed home position, said set of home positions includes each of four corners of a strike zone to set a contact position of a swing of a bat character to any of the four corners of the strike zone by positioning of the contact cursor, and the prescribed home position is selectable from among said four corners based on which of said set of predefined keys is operated to effect the prescribed key operation.

* * * * *